United States Patent [19]
Umemoto

[11] Patent Number: 5,416,829
[45] Date of Patent: *May 16, 1995

[54] DUAL MODE CELLULAR RADIO COMMUNICATION APPARATUS HAVING AN ECHO CANCELLER EMPLOYED IN BOTH ANALOG AND DIGITAL MODES

[75] Inventor: Yuji Umemoto, Tokyo, Japan

[73] Assignee: Kabushiki Kaisha Toshiba, Kanagawa, Japan

[ * ] Notice: The portion of the term of this patent subsequent to Nov. 16, 2010 has been disclaimed.

[21] Appl. No.: 114,621

[22] Filed: Sep. 1, 1993

Related U.S. Application Data

[63] Continuation of Ser. No. 800,426, Nov. 27, 1991, Pat. No. 5,263,079.

[30] Foreign Application Priority Data

Nov. 30, 1990 [JP] Japan ................................. 2-340239

[51] Int. Cl.[6] .......................................... H04M 11/00
[52] U.S. Cl. ............................................... 379/58
[58] Field of Search ..................... 379/56, 57, 58, 142, 379/343, 390, 411

[56] References Cited

U.S. PATENT DOCUMENTS

| | | | |
|---|---|---|---|
| 4,605,826 | 8/1986 | Kanemasa | 179/170.2 |
| 4,629,829 | 12/1986 | Puhl et al. | 379/58 |
| 4,636,586 | 1/1987 | Schiff | 379/390 |
| 5,014,294 | 5/1991 | Kromenaker et al. | 379/58 |
| 5,263,079 | 11/1993 | Umemoto | 379/58 |

*Primary Examiner*—Curtis Kuntz
*Assistant Examiner*—William Cumming
*Attorney, Agent, or Firm*—Banner, Birch, McKie & Beckett

[57] ABSTRACT

A dual mode cellular radio communication apparatus includes an echo canceller which cancels echo signals caused by acoustic coupling between a hands-free microphone and a loudspeaker in both analog mode and digital modes. An analog-to-digital converter and digital-to-analog converter may be used both in an analog mode and in a digital mode. A second analog-to-digital converter and a second digital-to-analog converter may be selectively used in the analog or digital mode. The echo canceller may be rendered inoperative during hand-set operation. In addition, a bypass circuit may be provided between an input and an output of the echo canceller so that the echo canceller is bypassed.

9 Claims, 16 Drawing Sheets

DUAL MODE CELLULAR RADIO COMMUNICATION APPARATUS HAVING AN ECHO CANCELLER EMPLOYED IN BOTH ANALOG AND DIGITAL MODES

CROSS-REFERENCE TO RELATED APPLICATION

This application is a continuation of U.S. application Ser. No. 07/800,426, filed Nov. 27, 1991, which was issued as U.S. Pat. No. 5,263,079.

BACKGROUND OF THE INVENTION

1. Field of the Invention

The present invention relates to the field of radio communication apparatus such as mobile telephones, portable telephones, cordless telephones, and the like. More specifically, the present invention relates to a radio communication apparatus used in a radio communication system in which radio frequency signals are selectively transmitted in either analog or digital mode between a base station and a mobile unit.

2. Description of the Related Art

As the number of subscribers in cellular radio systems increase, it is desirable to incorporate digital signal transmission methods into the analog cellular systems that are presently available in order to transmit speech signals at a more efficient transmission rate. A system of this type is called a Dual Mode Cellular Radio System. In such a system, speech signals may be selectively transmitted between a base station and a mobile unit over speech radio links in either analog or digital mode. In addition, control signals are transmitted between the base station and the mobile unit over common control radio links.

The mobile units in such a system require circuits for transmission/reception in the analog mode and circuits for transmission/reception in the digital mode. The result is that the number of components required for the mobile unit is increased, thereby increasing the cost of manufacturing the mobile unit. This is especially true when an echo-canceller is employed to cancel echo signals caused by acoustic coupling between a microphone and a loudspeaker, for example, during hands-free operation. As a result, two echo-cancellers are needed: one for digital mode operations and one for analog mode operations.

SUMMARY OF THE INVENTION

It is accordingly an object of the present invention to provide a light and miniaturized dual mode cellular radio communication apparatus capable of accommodating circuits for the analog and digital modes.

It is another object of the present invention to provide a dual mode cellular radio communication apparatus which may operate in the analog and digital modes with reduced power consumption.

It is still another object of the present invention to provide a dual mode cellular radio telephone apparatus in which the number of components may be reduced.

To achieve one or more of the objects, as embodied and described herein, the radio communication apparatus according to the present invention comprises a receiver for receiving radio frequency signals transmitted over a radio link, for demodulating the received radio frequency signals into analog signals of a predetermined frequency, and for outputting demodulated analog signals; a transmitter for modulating the signals supplied to the transmitter into radio frequency signals and for transmitting the radio frequency signals over the radio link; a microphone for inputting speech signals to be transmitted; a first analog-to-digital converter for converting the input speech signal into digital speech signals; a first digital-to-analog converter for converting digital signals which are applied to the first digital-to-analog converter into analog speech signals; a speaker for outputting speech signals corresponding to the received radio frequency signals; an echo canceller coupled to the first analog-to-digital converter and the first digital-to-analog converter for cancelling echo signals caused by acoustic coupling between the microphone and the speaker and for outputting echo-free signals; a second analog-to-digital converter for converting the demodulated analog signals applied from the receiver into digital signals and outputting the digital signals when the apparatus operates in the digital mode; a decoding and encoding processor for decoding the digital signals supplied from the second analog-to-digital converter, for supplying the decoded digital signals to the echo canceller, for encoding the echo-free digital signal, and for outputting the encoded digital signal when the apparatus operates in the digital mode; a second digital-to-analog converter for converting the encoded digital signals received from the decoding and encoding processor into analog signals and for supplying the analog signals to the transmitter when the apparatus operates in the digital mode; a third digital-to-analog converter for converting the echo-free signals supplied from the echo canceller into analog signals and for outputting the analog signals when the apparatus operates in the analog mode; an analog signal processor for processing the analog signals supplied from the third digital-to-analog converter, for supplying the processed analog signals to the transmitter, for processing the demodulated analog signals received from the receiver, and for outputting the processed analog signals when the apparatus operates in the analog mode; and a third analog-to-digital converter for converting the processed analog signals received from the analog signal processor into digital signals and for supplying the digital signals to the echo canceller when the apparatus operates in the analog mode.

The second analog-to-digital converter and the third analog-to-digital converter may be implemented in one unit. In such a case, a switch for selectively supplying the demodulated analog signals from the receiver or the processed analog signals from the analog signal processor to the unit may be provided. In addition, a switch for selectively supplying the output signal of the unit to the decoding and encoding processor or the echo canceller may be provided.

The second digital-to-analog converter and the third digital-to-analog converter may be implemented in one unit. In such a case, a switch for selectively supplying the encoded digital signals from the decoding and encoding processor or the echo-free signals from the echo canceller to the unit may be provided. A switch for selectively supplying the output signal from the unit to the transmitter or to the analog signal processor may also be provided.

The decoding and encoding processor, the second analog-to-digital converter, and the second digital-to-analog converter may be rendered inoperative when the apparatus operates in the analog mode. The analog signal processor, the third analog-to-digital converter, and the third digital-to-analog converter may be rendered inoperative when the apparatus operates in the digital mode. The decoding and encoding processor may be bypassed by a bypass circuit when the second analog-to-digital converter and the third analog-to-digital converter, the second digital-to-analog converter and the third digital-to-analog converter are commonly used, respectively and the apparatus operates in the analog mode.

The apparatus may include a handset unit having a handset speaker and a handset microphone. In such a case, the echo canceller may be rendered inoperative when the handset unit is used in a speech operation. Furthermore, if the apparatus has a bypass circuit in addition to the handset unit, the echo canceller may be bypassed by the bypass circuit when the handset unit is used. If the apparatus includes the handset unit, the first analog-to-digital converter, the first digital-to-analog converter, the third analog-to-digital converter and the third digital-to-analog converter may be rendered inoperative when the handset unit is used and the apparatus operates in the analog mode. If the apparatus includes a bypass circuit in addition to the handset unit, the first analog-to-digital converter, the first digital-to-analog converter, the third analog-to-digital converter and the third digital-to-analog converter may be bypassed by the bypass circuit when the handset unit is used and the apparatus operates in the analog mode. Power may be cut off to the circuits when they are rendered inoperative.

The apparatus may further include a clock generator and one or more circuits having at least one CMOS element. The clock generator may be controlled so that the clock signals are not supplied to the CMOS elements while the circuits are rendered inoperative.

DETAILED DESCRIPTION OF THE PREFERRED EMBODIMENTS

Preferred embodiments of the present invention will be described with reference to the accompanying drawings.

Figure 1:
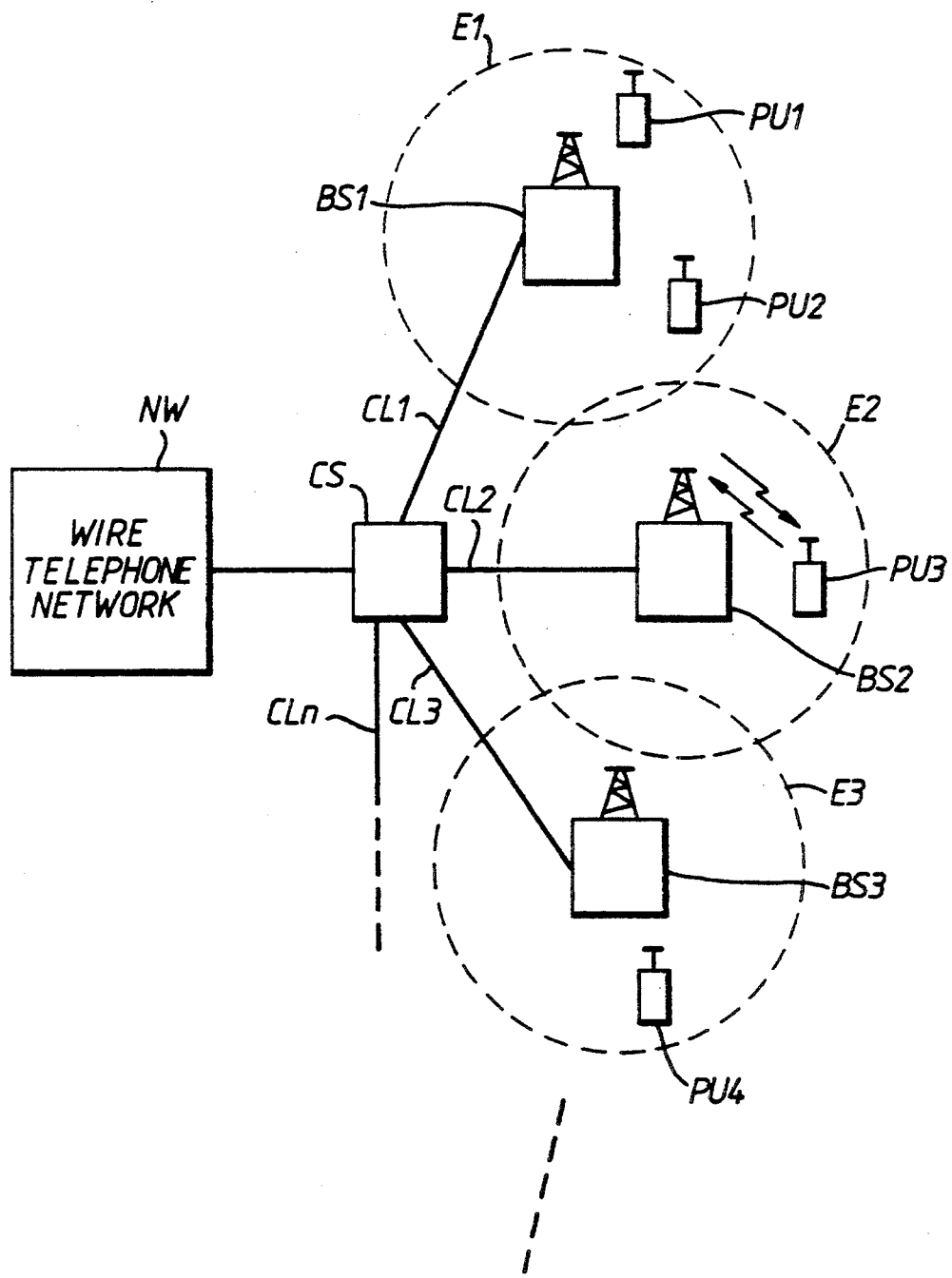
FIG. 1 shows an example of an arrangement of the cellular radio system.

First, a dual-mode-type mobile radio communication system will be described with reference to FIG. 1. The dual mode mobile radio communication system operates in either an analog mode or a digital mode. FIG. 1 shows an example of a cellular radio system. The system, as shown in FIG. 1, comprises a control station CS connected to a wire telephone network NW, a plurality of base stations BS1-BS3 which are respectively connected to the control station CS via the landlines CL1-CL3, and a plurality of mobile radio units PU1-PU4. Each of these base stations. BS1-BS3 has its own radio zone E1-E3, respectively. The mobile radio units PU1-PU4 may be in communication with the base stations BS1-BS3 via radio links in the radio zones E1-E3.

The system may operate in the following manner. A control channel is first established for exchanging control signals between the base station and the mobile radio unit. A speech channel operating in either the analog mode or the digital mode is then established between the base station and the mobile radio unit depending on a mode designation signal included in the control signals. In the analog mode, a modulator angle-modulates carrier signals with speech signals and data. A transmitter then transmits the angle-modulated carrier signals. A receiver receives the-angle-modulated carrier signals and a demodulator angle-demodulates the carrier signals to reproduce the speech signals and the data. In addition, an analog audio circuit may be provided which performs signal-processing such as compression and expansion of transmission and reception signals, and frequency band limiting of speech signals.

In the digital mode, an encoder encodes speech signals and data. A modulator modulates carrier Signals with the encoded digital speech signals and data. A transmitter then transmits the modulated carrier signals. For receiving information, a receiver receives the modulated carrier signals, a demodulator demodulates the carrier signals into baseband signals, and then a decoder decodes the baseband signals to reproduce the speech signals. Moreover, in the digital mode, the digital speech signals are transmitted between the base station and the mobile radio stations by means of TDMA (Time Division Multiple Access) transmission method. A digital modem, a speech-encoder/decoder (hereinafter referred to as speech-codec) for encoding and decoding speech signals, a channel-encoder/decoder (hereinafter referred to as channel-codec) for performing error correction and interleaving/deinterleaving for TDMA transmission may be provided.

In addition, the telephone system may include an echo-canceller both in the analog and the digital mode. The echo-canceller is used for cancelling acoustic echoes caused between a loudspeaker and a microphone during hands-free operation.

Figure 2:
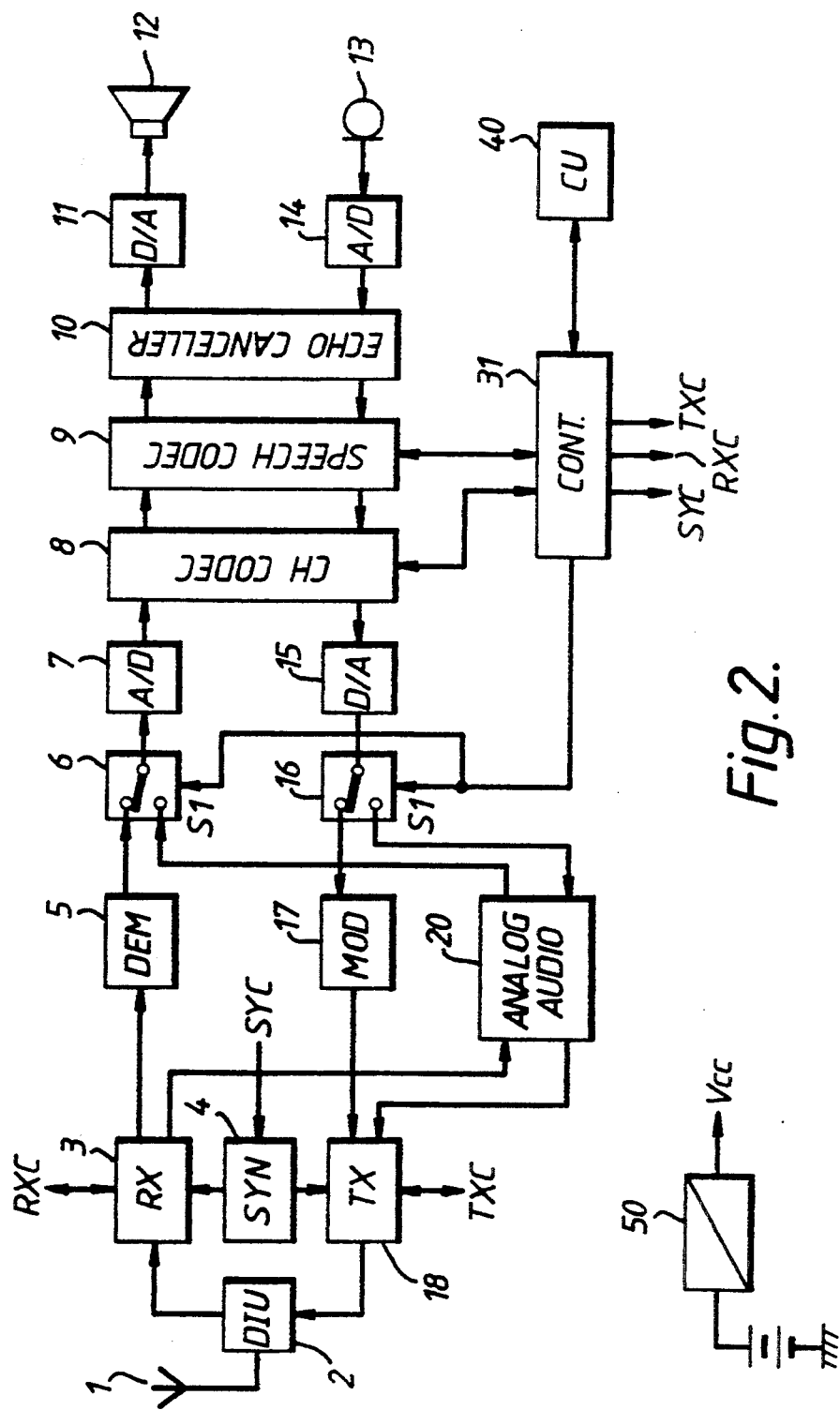
FIG. 2 is a block diagram showing a dual-mode-type mobile radio telephone according to a first embodiment of the present invention.

FIG. 2 is a block diagram showing an arrangement of the dual-mode-type mobile radio telephone according to a first embodiment of the present invention.

The mobile radio-telephone, as shown in FIG. 2, comprises an antenna 1 and a duplexer 2 in communication with the antenna 1. A receiver 3 and a transmitter 18 are coupled to the duplexer 2. A digital demodulator 5 for use in the digital mode is coupled to the receiver 3. A digital modulator 17 for use in the digital mode is coupled to the transmitter 18. A synthesizer 4 provides signals of prescribed frequencies to the receiver 3 and the transmitter 18. An analog audio circuit 20 for use in the analog mode is additionally coupled to the receiver 3 and the transmitter 18.

A channel-codec 8 and a speech-codec 9 coupled to the channel-codec are also provided. An echo-canceller 10 communicates with the speech-codec 9. An analog-to-digital converter (hereinafter referred to as A/D converter) 7 is connected to the channel-codec 8 and a digital-to-analog converter (hereinafter referred to as D/A converter) 15 is connected to the channel codec 8. An analog switch 6 is coupled between the digital demodulator 5 and the A/D converter 7. An analog switch 16 is coupled between the D/A converter 15 and the digital modulator 17. A D/A converter 11 is coupled between a loudspeaker 12 and the echo-canceller 10. An A/D converter 14 is coupled between a microphone 13 and the echo-canceller 10. Controller 31 is coupled to switch 6, switch 16, channel co-dec 8, and speech-codec 9. A control unit 40 having a hook switch, a keypad and a display communicates with controller 31. Power source circuit 50 supplies voltage Vcc to the circuitry from, for example, a battery.

The analog switches 6, 16 switch over in response to logic levels of switching control signal S1 output from the controller 31. Analog switches 6, 16 are controlled to selectively connect the digital demodulator 5 and the digital modulator 17 to the A/D converter 7 and the D/A converter 15, respectively, in the digital mode. In the analog mode, the analog switches 6, 16 are controlled to connect the analog audio circuit 20 to the A/D converter 7 and the D/A converter 15.

The controller 31 mainly consists of a microcomputer. In addition to controlling radio link establishment operations, the controller 31 controls switching operations in the analog switches 6, 16 and operations of the channel-codec S and the speech-codec 9. The channel-codec 8 and the speech-codec 9 are rendered operative in the digital mode and inoperative in the analog mode. In the analog mode, speech signals pass through the channel-codec 8 and the speech-codec 9 without being encoded and decoded.

The operations of the mobile radio telephone will be described below. The mode of the apparatus, either the analog mode or the digital mode, is determined on the basis of a mode designation signal included in the control signals which are transmitted from a base station and which also designate the speech channel. When the mobile radio unit receives the digital mode designation signal over the control channel, a speech radio link is established for transmission of the digital speech signals. Responsive to the establishment of the radio link, the controller 31 generates the signal S1 indicative of the digital mode. The analog switches 6, 16 switch to the digital demodulator 5 and the digital modulator 17, respectively, in response to the signal S1 designating the digital mode. The controller 31 provides control signals to initiate the operation of the channel-codec 8 and the speech-codec 9.

When the receiver 3 receives speech signals transmitted from the base station via the antenna 1 and the duplexer 2, the digital demodulator 5 demodulates the received signals into analog baseband signals. The A/D converter 7 converts the baseband signals supplied thereto via the analog switch 6 into digital signals. The channel-codec 8 deinterleaves the digital baseband signals and performs error correction operations on the deinterleaved signals. The output signals from the channel-codec 8 are applied to the speech-codec 9 and decoded into digital speech signals. The output signals from the speech-codec 9 pass through the echo-canceller 10 and are supplied to the D/A converter 11. The D/A converter 11 converts the decoded digital speech signals to analog speech signals. The analog speech signals are output via the loudspeaker 12.

When speech signals are input to the microphone 13, the A/D converter 14 converts the speech signals into digital signals. The echo-canceller 10 cancels echo signals caused by acoustic signals input to the microphone 13 from the loudspeaker 12. The echo-free signals are encoded in the speech-codec 9 and the encoded speech signals are supplied to the channel-codec 8.

In the channel-codec 8, an error correcting code is added to the encoded speech signals and the resulting speech signals are interleaved. The D/A converter 15 converts the interleaved signals into analog signals. The analog signals are input to the digital modulator 17 via the analog switch 16 and modulated therein. The transmitter 18 converts the modulated signals into radio frequency signals of 800–900 MHz and power amplifies the radio frequency signals. The power amplified radio frequency signals are transmitted through the duplexer 2 and the antenna 1.

When the mobile radio unit receives the analog mode designation signal over the control channel, a speech radio link for transmission of the analog speech signals is established. Responsive to the establishment of the radio link, the controller 31 generates the signal S1 indicative of the analog mode.

The analog switches 6, 16 switch to the analog audio circuit 20 responsive to the signal S1 designating the analog mode. Because in the analog mode it is not necessary to encode and decode signals, the controller 31 provides a control signal to the channel-codec 8 and the speech-codec 9 so that the channel-codec 8 and the speech-codec 9 are rendered inoperative.

When the receiver 3 receives speech signals transmitted from the base station via the antenna 1 and the duplexer 2, the receiver 3 demodulates the speech signals. The analog audio circuit 20 band limits and expands the demodulated signals. The A/D converter 7 converts the expanded signals supplied thereto via the analog switch 6 into digital signals. The digital signals are supplied to the channel-codec 8 and the speech-codec 9. Because the channel-codec 8 and the speech-codec 9 are rendered inoperative by the signal S1, the channel-codec 8 and the speech-codec 9 pass the digital signals without performing encoding and decoding operations. The signals are input to and pass through the echo-canceller 10. The D/A converter 11 converts the signals which passed through the echo-canceller 10 into analog signals. The analog signals are output via the loudspeaker 12.

When speech signals are input to the microphone 13, the A/D converter 14 converts the speech signals into digital signals. The echo-canceller 10 cancels echo signals caused by acoustic signals input to the microphone 13 from the loudspeaker 12. The echo-free signals are supplied to the speech-codec 9 and the channel-codec 8. As above, because the speech-codec 9 and the channel-codec 8 are rendered inoperative by the signal S1, the speech-codec 9 and the channel-codec 8 pass the echo-free signals without performing encoding and decoding operations. The D/A converter 15 converts the signals which passed through the speech-codec 9 and the channel-codec 8 into analog signals. The analog signals are input to the analog audio circuit 20 via the analog switch 16. The analog audio circuit 20 band limits and compresses the analog signals. The transmitter 18 modulates the compressed signals and transmits the signals to the base station via the duplexer 2 and the antenna 1.

According to the embodiment described above, the telephone unit includes the analog switches 6, 16, the A/D converter 7 and the D/A converter 15 which may be used in both the analog and the digital mode. Moreover, the echo-canceller 10 may be used in both the analog and the digital mode. Therefore, the telephone unit requires fewer A/D converters, fewer D/A converters, and only one echo-canceller. Thus, it is possible to simplify the circuitry and to reduce the size of the overall telephone unit.

Additionally, according to the embodiment described above, speech signals are input to the channel-codec 8 and the speech-codec 9 in the analog mode. However, the channel-codec 8 and the speech-codec 9 are rendered inoperative in the analog mode by the control signal S1. Therefore, the channel-codec 8 and the speech-codec 9 pass the speech signals without performing encoding and decoding operations. Accordingly, the present arrangement advantageously avoids unnecessary signal processing.

Figure 3:
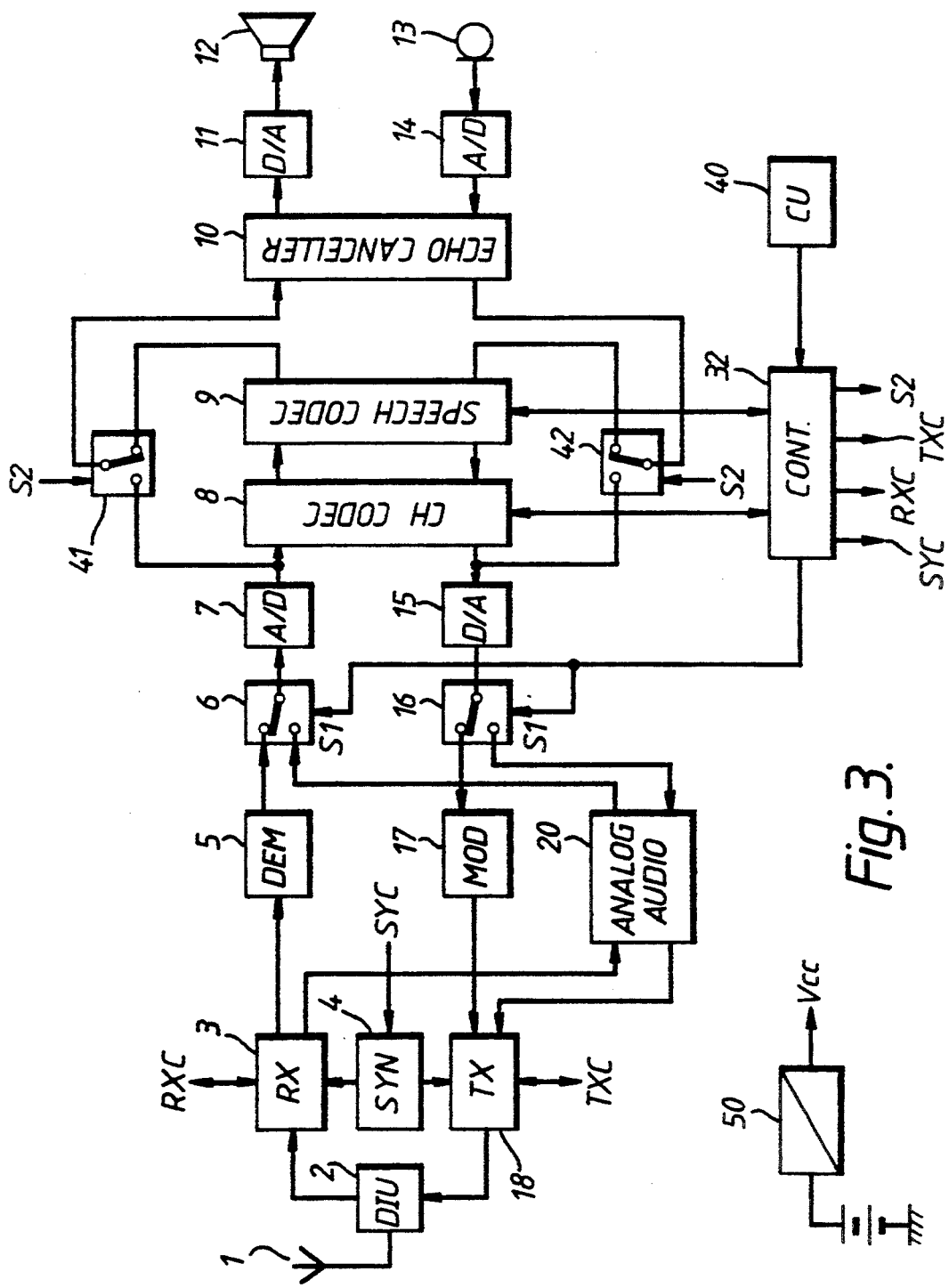
FIG. 3 is a block diagram showing a dual-mode-type mobile radio telephone according to a second embodiment of the present invention.

FIG. 3 is a block diagram showing an arrangement of the dual-mode-type mobile radio telephone according to a second embodiment of the present invention. The components common to FIGS. 2 and 3 are given the same reference numbers. Such common components in FIG. 3 generally operate in a manner similar to that of the corresponding components in FIG. 2.

The mobile radio telephone of FIG. 3 further comprises a bypass circuit having an analog switch 41 provided on the reception path between an input of the channel-codec 8 and an output of the speech-codec 9 and having an analog switch 42 provided on the transmission path between an input of the speech-codec 9 and an output of the channel-codec 8. The bypass circuit is provided to permit speech signals to bypass the channel-codec 8 and the speech-codec 9. The analog switches 41, 42 are switched in response to logic levels of switching control signal S2 output from a controller 32. The controller 32 controls the analog switches 41, 42 to connect the speech-codec 9 to the echo-canceller 10 in the digital mode. Therefore, signals are input to the channel-codec 8 and the speech-codec 9. In the analog mode, the controller 32 controls the analog switches 41, 42 to connect A/D converter 7 and the D/A converter 15 to the echo-canceller 10. Therefore, signals bypass the channel-coded 8 and the speech-codec 9. Additionally, in the analog mode, the controller 32 cuts off the power supplied to the channel-codec 8 and the speech-codec 9 by disconnecting the power supply path thereto.

When the mobile radio unit receives the digital mode designation signal over the control channel, a speech radio link is established for transmission of the digital speech signals. Responsive to the establishment of the radio link, the controller 32 generates the signals S1 and S2 indicative of the digital mode.

The analog switches 6, 16 switch to the digital demodulator 5 and the digital modulator 17, respectively, in response to the signal S1 designating the digital mode. The analog switches 41, 42 switch over to the speech-codec 9 in response to the signal S2 designating the digital mode.

When the receiver 3 receives speech signals transmitted from the base station via the antenna 1 and the duplexer 2, the digital demodulator 5 demodulates the received signals into analog baseband signals. The A/D converter 7 converts the baseband signals supplied thereto via the analog switch 6 into digital signals. The channel-codec 8 deinterleaves the digital baseband and performs error correction operations on the deinterleaved signals. The output Signals from the channel-codec 8 are supplied to the speech-codec 9 and decoded into digital speech signals. The output signals from the speech-codec 9 pass through the echo-canceller 10 via the analog switch 41 and are supplied to the D/A converter The D/A converter 11 converts the decoded digital speech signals supplied from the echo-canceller 10 into analog speech signals. The analog speech signals are output via the loudspeaker 12.

When speech signals are input to the microphone 13, the A/D converter 14 converts the speech signals into digital signals. The echo-canceller 10 cancels echo signals caused by acoustic signals input to the microphone 13 from the loudspeaker 12. The echo-free signals are input to the speech-codec 9 via the analog switch 42. The speech-codec 9 encodes the echo-free digital signals from the echo canceller and supplies the encoded speech signals to the channel-codec 8. In the channel codec 8, an error correcting code is added to the encoded speech signals. In addition, the speech signals are interleaved. The D/A converter 15 converts the interleaved signals into analog signals. The analog signals are input to the digital modulator 17 via the analog switch 16 and modulated therein. The transmitter 18 converts the output signals into radio frequency signals of 800–900 MHz and power amplifies the resulting radio frequency signals. The power amplified radio frequency signals are transmitted through the duplexer 2 and the antenna 1.

When the mobile radio unit receives the analog mode designation signal over the control channel, a speech radio link is established for the transmission of analog speech signals. Responsive to the establishment of the radio link, the controller 32 generates the signals S1 and S2 indicative of the analog mode.

The analog switches 6, 16 switch over to the analog audio circuit 20 in response to the signal S1 designating the analog mode. The analog switches 41, 42 switch over to the A/D converter 7 and the D/A converter 15 in response to the signal S2 designating the digital mode. Therefore signals bypass the channel-codec 8 and the speech-codec 9. Additionally, because it is not necessary to encode and decode signals in the analog mode, the controller 32 cuts off the power supplied to the channel-codec 8 and the speech-codec 9 by disconnecting the power supply path thereto.

The receiver 3 receives and demodulates speech signals transmitted from the base station via the antenna 1 and the duplexer 2. The analog audio circuit 20 band limits and expands the demodulated signals. The A/D converter 7 converts the expanded signals supplied via the analog switch 6 into digital signals. The digital signals are supplied to the echo-canceller 10 via the analog switch 41. The digital signals pass through the echo-canceller 10 and are supplied to the D/A converter 11. The D/A converter 11 converts the digital signals into analog signals. The analog signals are output via the loudspeaker 12.

When speech signals are input to the microphone 13, the A/D converter 14 converts the speech signals to digital signals. The echo-canceller 10 cancels echo signals caused by the acoustic signals input to the microphone 13 from the loudspeaker 12. The echo-free signals are input to the D/A converter 15 via the analog switch 42. The D/A converter 15 converts the echo-free signals to analog signals. The analog signals are supplied to the analog audio circuit 20 via the analog switch 16. The analog audio circuit 20 band limits and compresses the analog signals. The transmitter 18 modulates the compressed signals and transmit the signals to the base station via the duplexer 2 and the antenna 1.

According to the second embodiment described above, the A/D converter 7 and the D/A converter 15 may be used in both the analog and the digital mode. Moreover, the echo-canceller 10 may be used in both the analog and the digital mode. Therefore, the telephone unit requires fewer A/D converters, fewer D/A converters, and only one echo-canceller. Thus, it is possible to simplify the circuit arrangement as well as reduce the size of the telephone unit.

Additionally, according to the embodiment described above, because the telephone unit includes analog switches 41 and 42, signals bypass the channel-codec 8 and the speech-codec 9 in the analog mode. Accordingly, unnecessary processing of the speech signals is avoided. Furthermore, the controller 32 cuts off the power supplied to the channel-codec 8 and the speech-codec 9 when in the analog mode. Accordingly, the channel-codec 8 and the speech-codec 9 consume no power in the analog mode. Consequently, the power consumed by the telephone unit is reduced.

Figure 4:
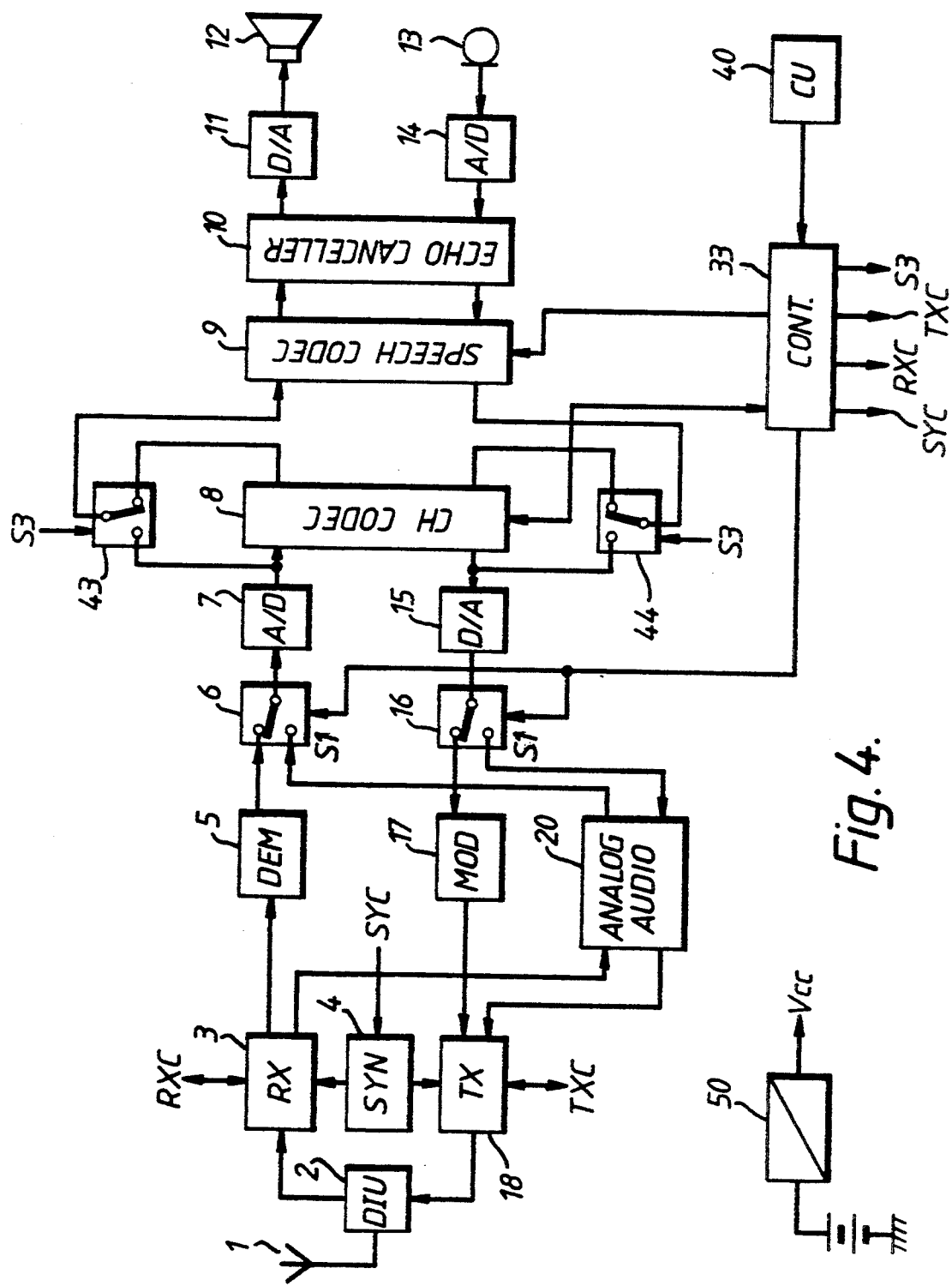
FIG. 4 is a block diagram showing a dual-mode-type mobile radio telephone according to a third embodiment of the present invention.

FIG. 4 is a block diagram showing an arrangement of the dual-mode-type mobile radio telephone according to a third embodiment of the present invention.

The mobile radio telephone of FIG. 4 includes a bypass circuit having an analog switch 43 provided on the reception path between an input and an output of the channel-codec 8 rather than between the A/D converter 7 and the echo-canceller 10 as in FIG. 3. An analog switch 44 is also provided on the transmission path between an input and an output of the channel-codec 8 in further contrast to FIG. 3. The bypass circuit is provided so that speech signals bypass the channel-codec 8. The analog switches 43, 44 switch over in response to logic levels of switching control signal S3 output from a controller 33. The controller 33 controls the analog switches 43, 44 to connect the channel-codec 8 to the speech-codec 9 in the digital mode so that signals are input to the channel-codec 8. In the analog mode, the controller 33 controls the analog switches 43, 44 to respectively connect the A/D converter 7 and the D/A converter 15 to the speech-codec 9 so that signals bypass the channel-codec 8.

Additionally, in the analog mode, the controller 33 provides a control signal to the speech-codec 9 so that the speech-codec 9 is rendered inoperative. Moreover, in the analog mode, the controller 33 cuts off the power supplied to the channel-codec 8 by disconnecting the power supply path thereto. Further, it is possible provide the bypass switch between an input and an output of the speech-codec 9. In this case, the controller 33 provides a control signal to the channel-codec 8 in the analog mode so that the channel-codec 8 is rendered inoperative. The controller 33 may also cuts off the power supplied to the speech-codec 9 by disconnecting the power supply path thereto.

The first, second and third embodiments were described in connection with a loudspeaker 12 and a microphone 13 for hands-free operations. The present invention, however, is also applicable to a telephone which has a handset as well as a loudspeaker 12 and a microphone 13.

Figure 5:
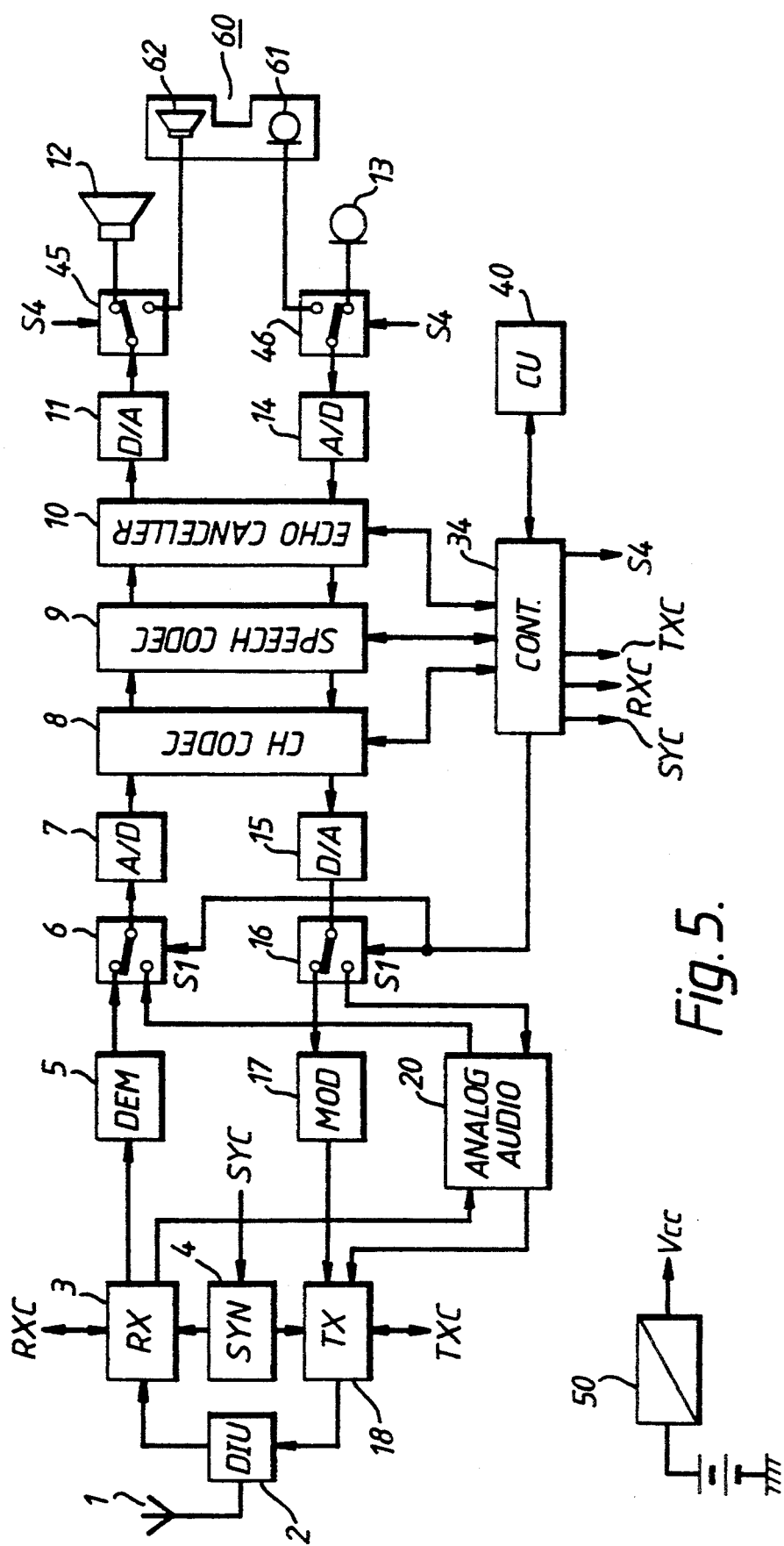
FIG. 5 is a block diagram showing a dual-mode-type mobile radio telephone according to a fourth embodiment of the present invention.

FIG. 5 is a block diagram showing an arrangement of the dual-mode type mobile radio telephone according to a fourth embodiment of the present invention. The mobile radio telephone shown in FIG. 5, as compared to the telephone shown in FIG. 2, further comprises a handset 60 which includes a handset microphone 61 and a handset speaker 62, and analog switches 45, 46.

The analog switches 45, 46 are switched in response to logic levels of switching control signal S4 output from a controller 34. The controller 34 controls analog switch 45 to connect the D/A converter 11 to the loudspeaker 12 for hands-free operation and to connect the D/A converter 11 to the handset speaker 62 for handset operation. The controller 34 also controls analog switch 46 to connect the A/D converter 14 to the microphone 13 for hands-free operation and to connect the A/D converter 14 to the handset microphone 61 for handset operation.

For handset operations, the controller 34 provides a control signal to render echo-canceller 10 inoperative. Additionally, there is little need for the echo-canceller 10 during handset operation of a mobile radio telephone as shown in FIG. 5, for example. Therefore, it is possible to remove the echo-canceller 10 from the reception and transmission paths and to cut off the power supplied to the echo-canceller 10.

Figure 6:
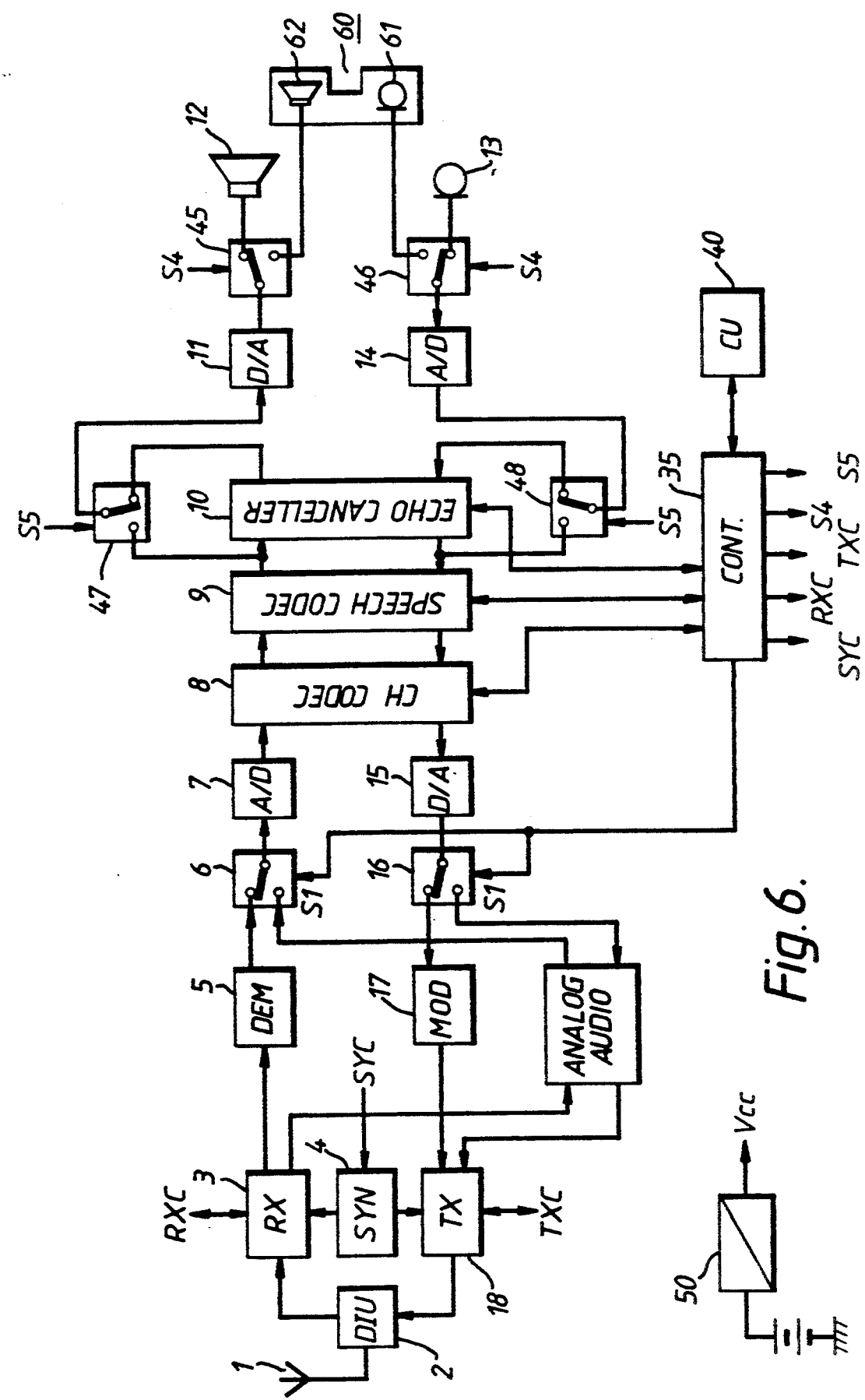
FIG. 6 is a block diagram showing a dual-mode-type mobile radio telephone according to a fifth embodiment of the present invention.

FIG. 6 is a block diagram showing an arrangement of the dual-mode-type mobile radio telephone according to a fifth embodiment of the present invention.

The mobile radio telephone, as shown in FIG. 6, further comprises a bypass circuit having analog switches 47, 48 provided on the reception and transmissions paths respectively between an input and an output of the echo-canceller 10. The bypass circuit is provided so that speech signals bypass the echo-canceller 10. The analog switches 47, 48 are switched in response to logic levels of switching control signal S5 output from a controller 35. The controller 35 controls the analog switch 47 to connect the D/A converter 11 to the echo-canceller for hands-free operation and to connect the D/A converter 11 to the speech-codec 9 for handset operation. The controller 35 also controls analog switch 48 to connect the A/D converter 14 to the echo-canceller 10 for hands-free operation and to connect the A/D converter 14 to the speech-codec 9 for handset operation. Additionally, during handset operation, the controller 35 cuts off the power supplied to the echo-canceller 10 by disconnecting the power supply path thereto.

According to the embodiment described above, the echo-canceller 10 consumes no power during handset operation. Consequently, the power consumed by the telephone is reduced.

Figure 7:
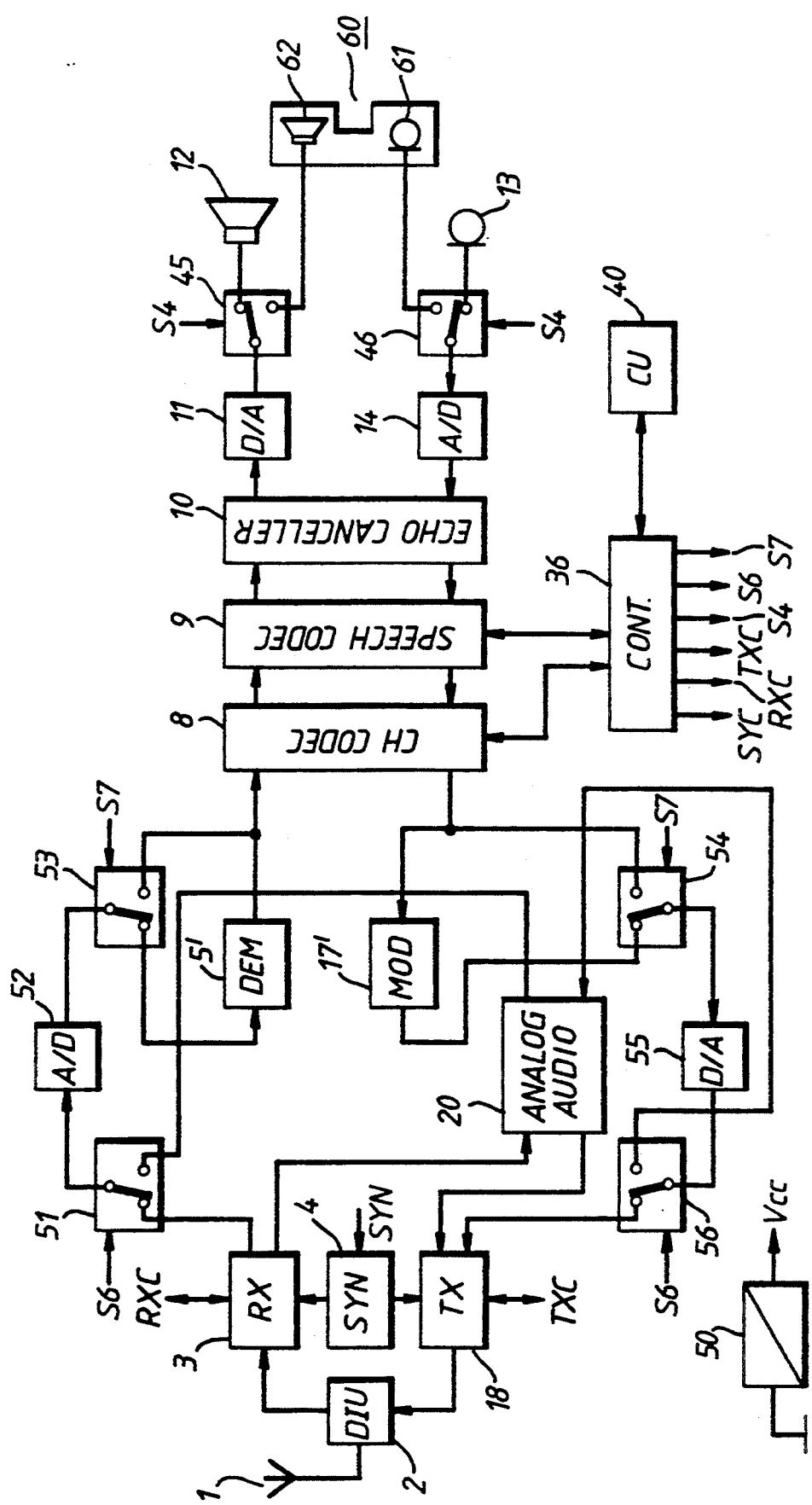
FIG. 7 is a block diagram showing a dual-mode-type mobile radio telephone according to a sixth embodiment of the present invention.

FIG. 7 is a block diagram showing an arrangement of the dual-mode-type mobile radio telephone according to a sixth embodiment of the present invention.

The mobile radio telephone apparatus, as shown in FIG. 7, includes a digital demodulator 5' and a digital modulator 17', each being connected to the channel-codec 8. An A/D converter 52 is provided between digital demodulator 5' and receiver 3. A D/A converter 55 is provided between digital demodulator 17' and transmitter 18. An analog switch 51 is interposed between the receiver 3 and the A/D converter 52, and an analog switch 53 is interposed between the A/D converter 52 and the digital demodulator 5'. An analog switch 54 is interposed between the digital modulator 17' and the D/A converter 55, and an analog switch 56 is provided between the D/A converter 55 and the transmitter The analog switches 51, 56 switch over in response to logic levels of switching control signal S6 output from a controller 36. The analog switches 53, 54 switch over in response to logic levels of switching control signal S7 output from the controller 36. The controller 36 controls the analog switch 51 to connect the A/D converter 52 to the receiver 3 in the digital mode and to the analog audio circuit 20 in the analog mode. The controller 36 also controls the analog switch 56 to connect the D/A converter 55 to the transmitter 18 in the digital mode and to the analog audio circuit 20 in the analog mode. In addition, the controller 36 controls the analog switch 53 to connect the D/A converter 52 to the digital demodulator 5' in the digital mode and to the channel-codec 8 in the analog mode. Furthermore, the controller 36 controls the analog switch 54 to connect the D/A converter 55 to the digital modulator 17' in the digital mode and to the channel-codec 8 in the analog mode. Therefore, in the digital mode, speech signals are modulated in the modulator 17' and demodulated in the digital demodulator 5'. In the analog mode, speech signals are processed in the analog audio circuit 20.

Figure 8:
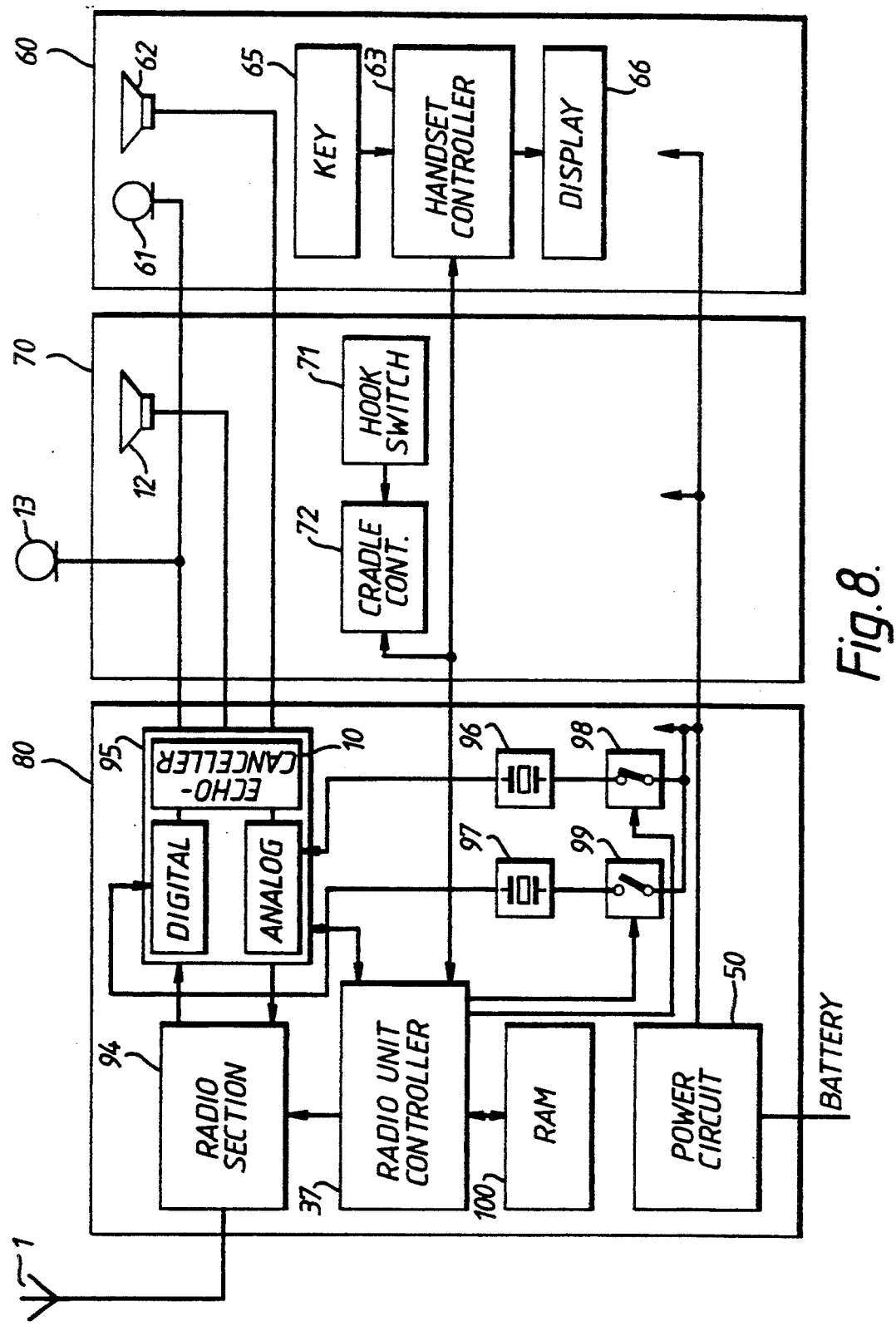
FIG. 8 is a block diagram showing a dual-mode-type mobile radio telephone according to a seventh embodiment of the present invention.

FIG. 8 is a block diagram showing an arrangement of the dual-mode-type mobile radio telephone according to a seventh embodiment of the present invention. The mobile radio telephone shown in FIG. 8 comprises a radio unit 80, a cradle 70 and a handset 60.

The radio unit 80 mainly comprises an antenna 1, a radio section 94 for establishing a radio link with a base station via the antenna 1, a speech circuit 95 connected with the radio section 94, a radio unit controller 37 for controlling each section or circuit of the radio unit 80, a power source circuit 50 for supplying voltage Vcc derived from a battery, an oscillator 96 for providing a clock for the analog processing section, an oscillator 97 for providing clock signals for the digital processing section, an analog switch 98 for switching power to oscillator 96, an analog switch 99 for switching power to oscillator 97, and a random access memory (hereinafter referred to as RAM) 100. The speech circuit 95 includes an analog processing section, a digital processing section and a echo-canceller 10 used both in the analog and the digital mode.

The cradle 70 mainly comprises a loudspeaker 12 and a microphone 13 connected with the speech circuit 95, a hook switch 71 for detecting the on-hook/off-hook condition of the handset 60, and a cradle controller 72 for controlling each section of the cradle 70. Power is supplied to the cradle 70 from the power source circuit 50.

The handset 60 mainly comprises a handset speaker 62 and a handset microphone 61 connected with the speech circuit 95, a handset controller 63 for controlling each section of the handset 60, a key section 65, and a display 66 such as a liquid crystal display (LCD). Key section 65 includes numerical keys for dialing, a send key for establishing a speech link, and an end key for terminating the speech link. However, the invention is not limited in this respect. Power is supplied to the handset 60 from the power source circuit 50.

Switching of the analog switches 98, 99 may be achieved as follows. When the mobile radio unit receives the digital mode designation signal over the control channel, a speech radio link is established for the transmission of the digital speech signals. Responsive to the establishment of the radio link, the radio unit controller 37 generates a control signal indicative of the digital mode.

In the digital mode, the radio unit controller 37 may, for example, open analog switch 98 and close analog switch 99. As a result, power is supplied to the oscillator 97 and power supplied to the oscillator 96 is cut off. Accordingly, clock signals are not provided from the oscillator 96 to the analog processing section of the speech circuit 95. However, clock signals are provided from the oscillator 97 to the digital processing section of the speech circuit 95. Thus, the analog processing section is rendered inoperative in the digital mode, and speech signals are processed in the digital processing section.

In the analog mode, the switching operations of the analog switches 98, 99 are opposite to those in the digital mode. Accordingly, the digital processing section is rendered inoperative, and speech signals are processed in the analog processing section. According to the embodiment described above, the telephone consumes less power because circuits are rendered inoperative if they are not required in the particular operating mode.

Figure 9A:
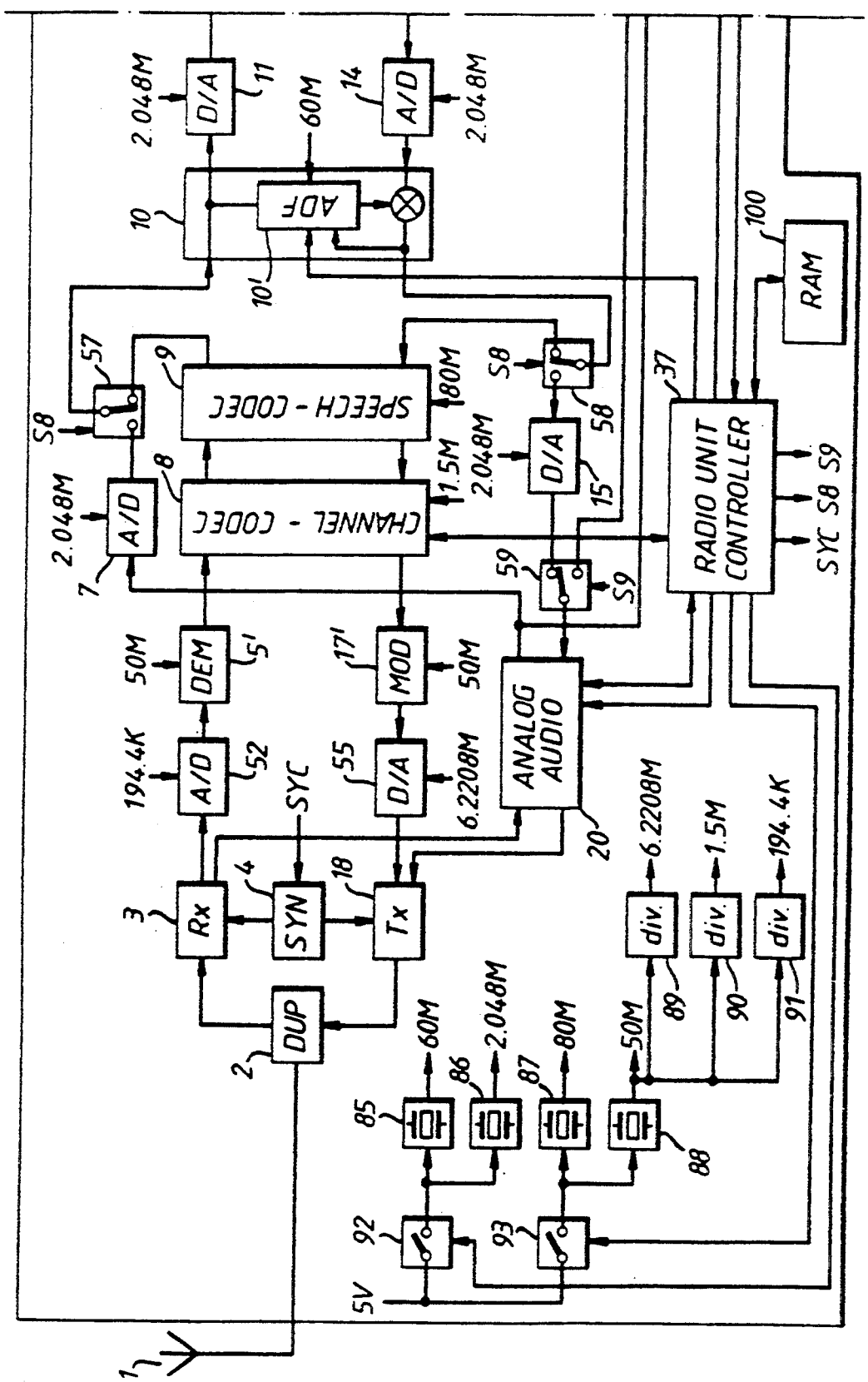
FIGS. 9A and 9B depict a block diagram showing a detailed arrangement of a dual-mode-type mobile radio telephone shown in FIG. 8.
Figure 9B:
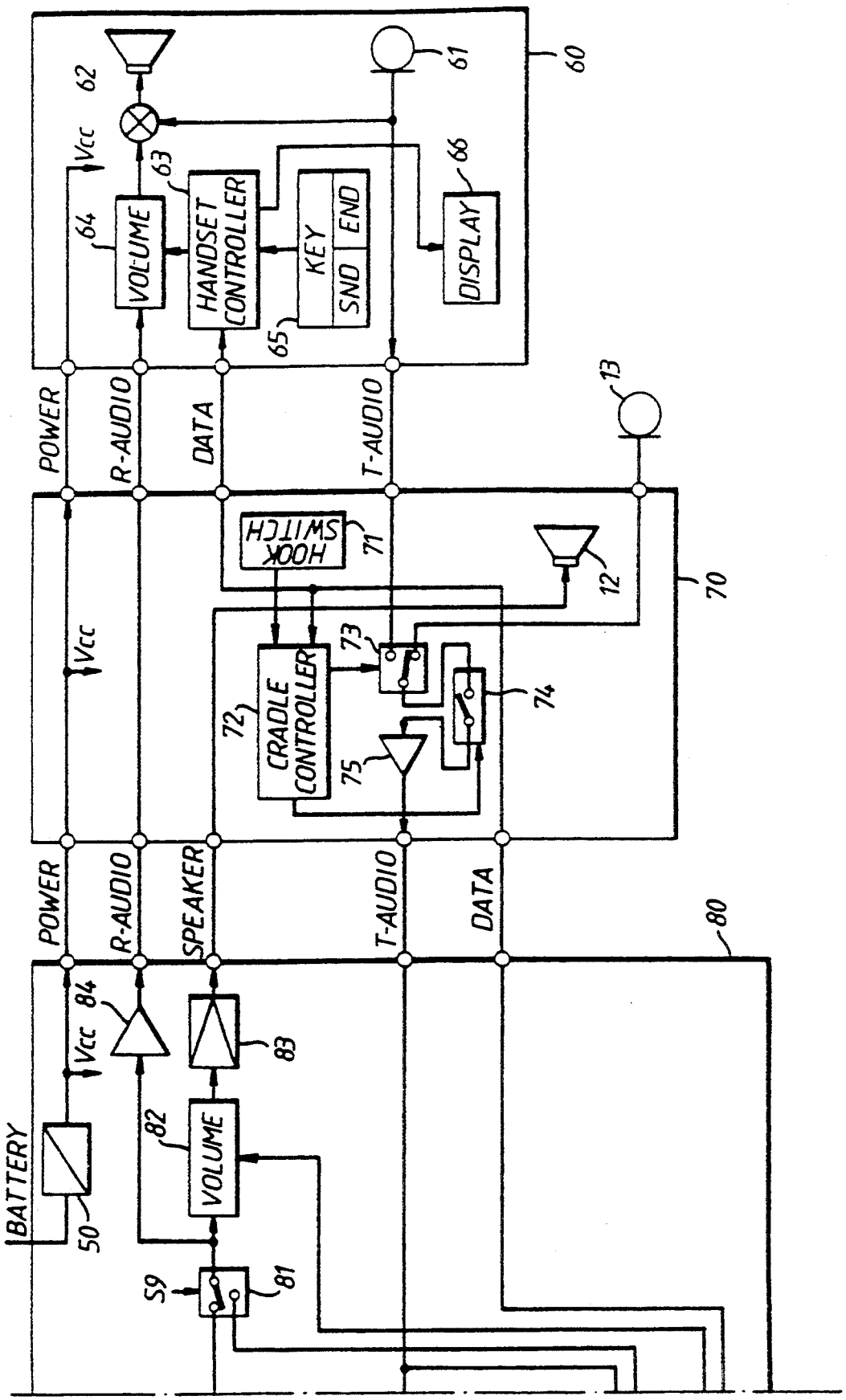

FIGS. 9A and 9B depict a block diagram showing a detailed arrangement of the mobile radio telephone shown in FIG. 8. Components common to FIGS. 8 and 9A and 9B are given the same reference numbers. In addition, the common components will operate in the same manner as described with respect to FIG. 8.

Analog switches 57, 58 are provided between the speech-codec 9 and the echo-canceller 10. The analog switches 57, 58 switch over in response to logic levels of switching control signal S8 output from the radio unit controller 37. The radio unit controller 37 Controls the analog switches 57, 58 to connect the echo-canceller 10 to the speech-codec 9 in the digital mode. In the analog mode, the radio unit controller 37 controls the analog switches 57, 58 to connect the echo-canceller 10 to the A/D converter 7 and the D/A converter 15, respectively.

Analog switches 59, 81 switch over in response to logic levels of the switching control signal S9 output from the radio unit controller 37. The radio unit controller 37 controls the analog switch 59 to connect the analog audio circuit 20 to the D/A converter 15 during hands-free operation in the analog mode, and to connect the analog audio circuit 20 to a T-Audio connecter during handset operation in the analog mode. The radio unit controller 37 also controls the analog switch 81 to connect a volume switch 82 to the D/A converter 11 during hands-free operation in the analog mode, and to connect the volume switch 82 to the analog audio circuit 20 during handset operation in the analog mode. In the digital mode, the radio unit controller 37 controls the analog switch 59 to connect the analog audio circuit 20 to the D/A converter 15 and controls the analog switch 82 to connect the volume switch 82 to the D/A converter 11. The volume switch 82 adjusts the speech-volume appropriately. Additionally, a power amplifier 83 amplifies the volume-adjusted signals and supplies the amplified signals to the loudspeaker 12. Furthermore, an amplifier 84 amplifies speech signals and supplies the amplified signals to the handset 60 via the cradle 70.

The D/A converter 11 and the A/D converter 14 may be formed from a CMOS (Complementary Metal Oxide Semiconductor) logic device. However, the invention is not limited in this respect. The echo-canceller 10 may be, for example, a digital signal processor formed from a CMOS logic device. The speech-codec 9 includes a speech encoder and a speech decoder. The speech encoder and the speech decoder are preferably each a digital signal processor formed from a CMOS logic device. The D/A converter 15 and the A/D converter 7 may, for example, be formed from a CMOS logic device. The channel-codec 8 is preferably a standard cell formed from a CMOS logic device. Each of the digital demodulator 5' and the digital modulator 17' may be a gate array circuit formed from a CMOS logic device, for example. The A/D converter 52 may be, for example, a CMOS logic device. The D/A converter 55 is preferably a bipolar transistor. The analog audio circuit is preferably an LSI (Large Scale Integrated Circuit) formed from a CMOS logic device.

Accordingly, when some or all of the above circuits are formed from CMOS devices, their operation may be controlled by clock signals supplied to the individual circuits.

The radio unit 80 may include an oscillators 85-88 for providing clock signals to operate each part and circuit of the radio unit 80. The oscillators 85-88 preferably have oscillating frequencies of 60 MHz, 2.048 MHz, 80 MHz, and 50 MHz. Additionally, the oscillating frequency of oscillator 88 may be divided in dividers 89, 90, and 91, the divided output frequencies preferably being 6.2208 MHz, 1.5 MHz, and 194.4 kHz, respectively. The oscillators 85, 86 are preferably supplied with 5 V obtained from the power source circuit 50 via an analog switch 92. The oscillators 87, 88 are preferably supplied with 5 V via an analog switch 93. The radio unit controller 37 controls switching operations in the analog switches 92, 93.

The 60 MHz oscillating frequency is provided for adaptive digital filter (hereinafter referred to as ADF) 10' in the echo-canceller 10. And further, the 2.048 MHz oscillating frequency is provided for the A/D converters 7, 14 and the D/A converters 11, 15; the 80 MHz oscillating frequency is provided for the speech-codec 9; the 50 MHz oscillating frequency is provided for the digital demodulator 5' and the digital modulator 17'; the 6.2208 MHz oscillating frequency is provided for the D/A converter 55; the 194.4 kHz oscillating frequency is provided for the A/D converter 52; and the 1.5 MHz oscillating frequency is provided for the channel-codec 8.

The A/D converters 7, 14 and the D/A converters 11, 15 preferably operate in accordance with the m-law. Therefore, these converters are essentially different from the A/D converter 52 and the D/A converter 55.

With respect to the preferred operation of the echo-canceller 10, speech signals to be output from the loudspeaker 12 are input to the ADF 10' from the reception path and are filtered therein. The ADF 10' has an impulse response characteristic for echo speech signals input to the microphone 13 from the loudspeaker 12. The ADF 10' has a plurality of filters.

The operation of the ADF 10' is as follows. Speech signals filtered in the ADF 10' are applied to a mixer, which may be embodied as a subtraction circuit. The mixer mixes the filtered signals and speech signals applied to the microphone 13. In the mixer, the echo signals caused by the acoustic signals input to the microphone 13 from the loudspeaker 12 are cancelled. The echo-free signals are output to the analog switch 58. The echo signals, however, are not always perfectly cancelled. Therefore, the echo-free signals are also input to the ADF 10' from the transmission path. In accordance with the amount of echo signals remaining in the echo-free signals, the number of the filters to be used in the ADF 10' is determined so as to better cancel the echo signals.

The cradle 70 further comprises analog switches 73', 74 and an amplifier 75. The cradle controller 72 controls the analog switch 73 to connect the analog switch 74 to the microphone 13 for hands-free operation, and to the handset microphone 61 for handset operation. The cradle controller 72 also controls the analog switch 74 to connect the amplifier 75 to the analog switch 73 thereby permitting the transmission of speech signals from the microphone 13 or the handset microphone 61, depending on the position of analog switch 73, through amplifier 75 to the radio unit 80. The amplifier 75 amplifies the speech signals received from the analog switch 74 before the signals are supplied to the radio unit 80. When the speech signals input to the microphone 13 or the handset microphone 61 should not be sent to the radio unit 80, the cradle controller 72 switches the analog switch 74 off.

The handset 60 further comprises a volume switch 64 for adjusting the speech volume appropriately. Speech signals input to the microphone 61 are supplied from the transmission path to the reception path as sidetones. This makes it possible for a user to hear his or her voice via the handset speaker 62.

Figure 10A:
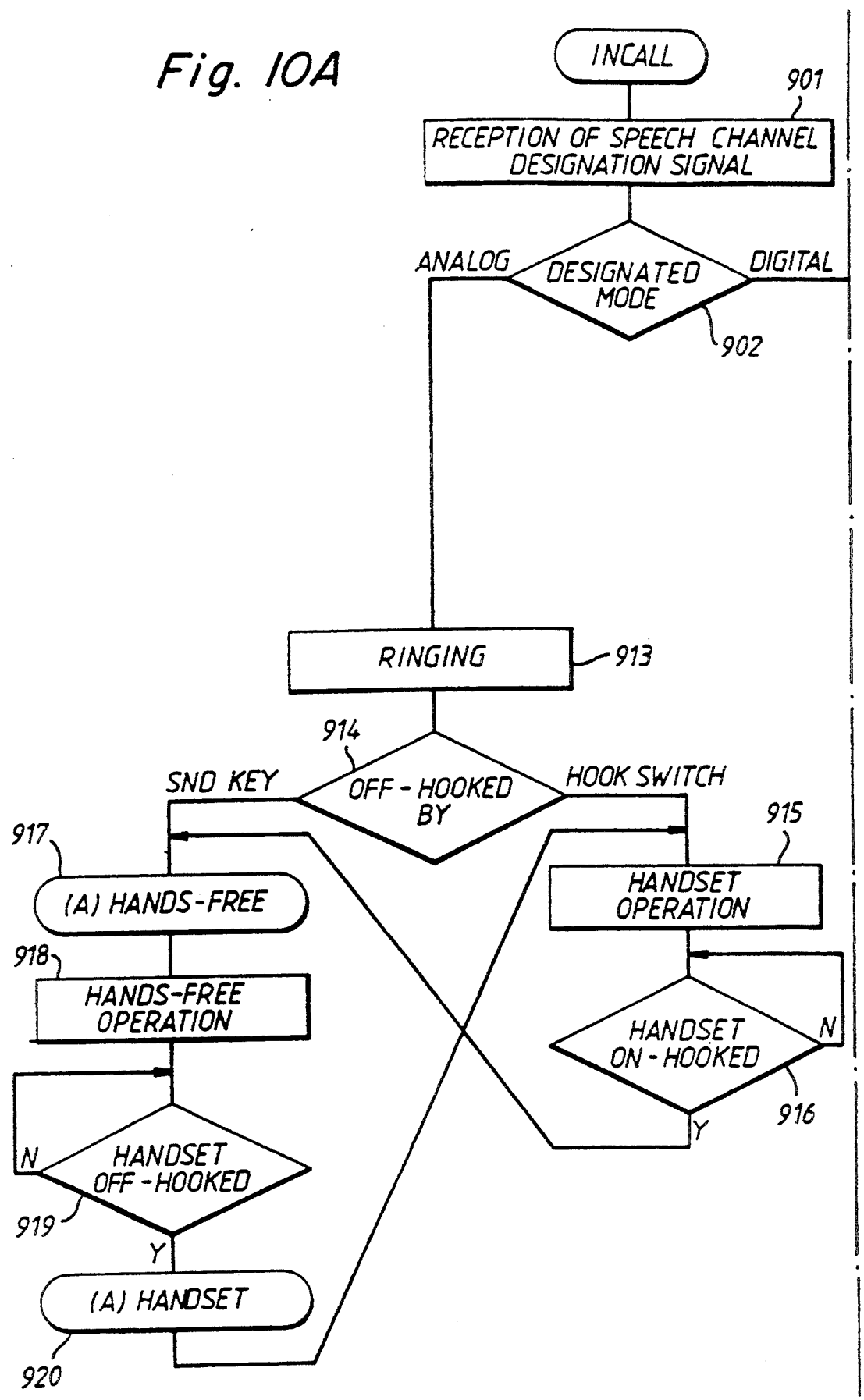
FIGS. 10A and 10B depict a flowchart for explaining the operations of the telephone shown in FIGS. 8 and 9 when an incoming call is received.
Figure 10B:
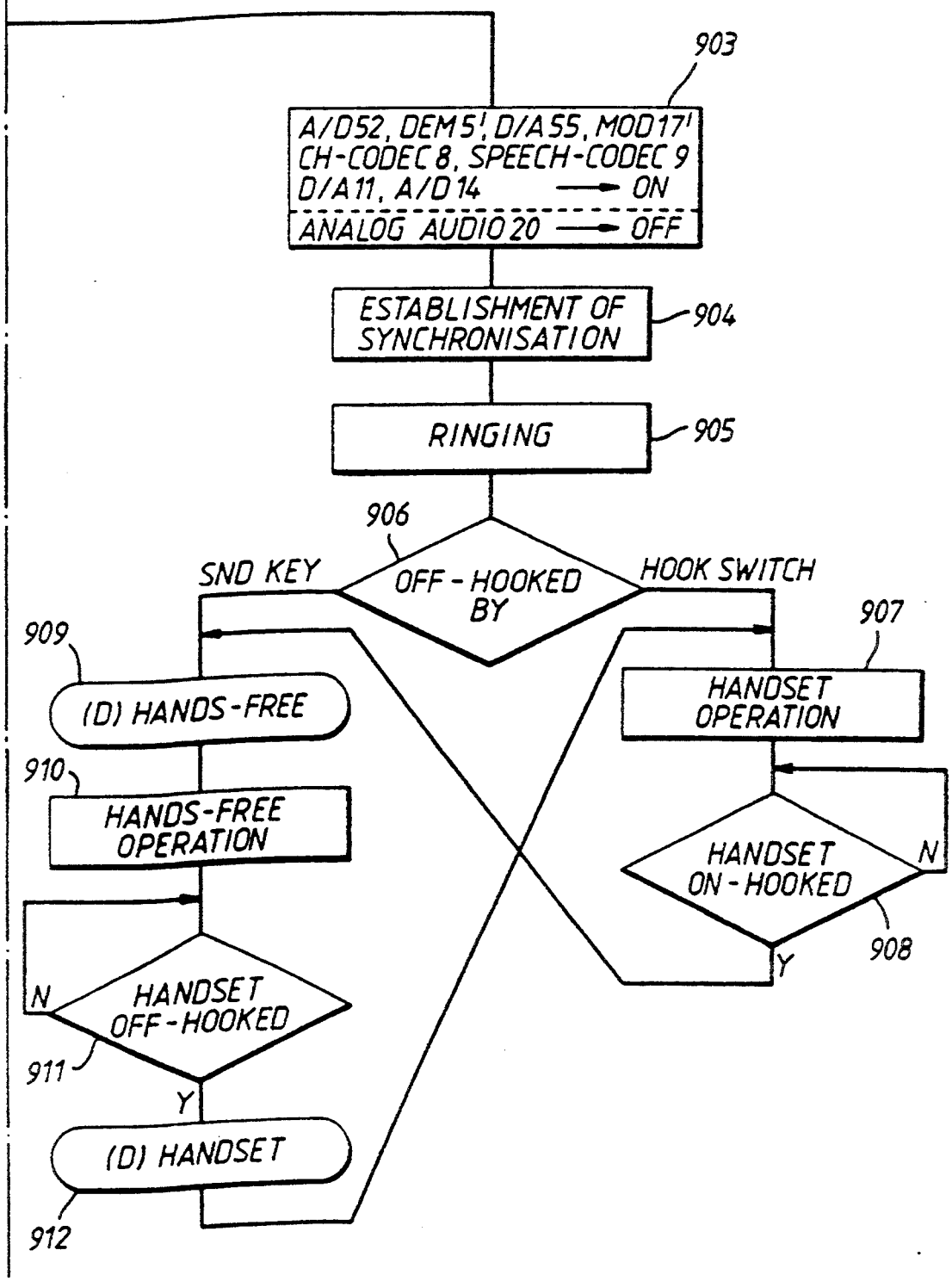

The operation of the seventh embodiment will be described in detail with reference to flowcharts shown in FIG. 10A to FIG. 15 as well as FIGS. 9A and 9B. FIGS. 10A and 10B depict a flowchart showing the operations for switching the analog switches when an incoming call is received.

When an incoming call is received over the control channel, the mobile radio telephone waits for the mode designation signal transmitted from a base station (step 901). That is, audio circuit 20 processes the received signals demodulated in the receiver 3 and sends them to the radio unit controller 37. The analog audio circuit 20 also processes data signals output from the radio unit controller 37 and sends them to the transmitter 18. The transmitter 18 modulates the processed signals and transmits them to the base station via the duplexer 2 and the antenna 1. During the above operations, all the parts or circuits are rendered inoperative except for the receiver 3, the transmitter 18, the analog audio circuit 20, the radio unit controller 37 and the synthesizer 4.

After the speech designation signal has been received in the step 901, the radio unit controller 31 determines whether the digital mode or the analog mode is designated by the mode designation signal (step 902).

If the designated mode is the digital mode, the telephone unit operates are as follows. The analog switches 92, 93 are closed or switched on in order to supply clock signals for the A/D converters 14, 52, the D/A converters 11, 55, the digital demodulator 5', the digital modulator 17', the channel-codec 8, and the speech-codec 9. The ADF 10' in the echo-canceller 10 is rendered inoperative by a control signal from the radio unit controller 37 even though a clock signal is supplied thereto. Therefore, responsive to the control signal from the radio unit controller 37, the ADF 10' does not perform the echo-cancelling operation and signals pass through the echo-canceller 10. The radio unit controller 37 also renders the analog audio circuit 20 inoperative, because it is not required to operate in the digital mode (step 903).

The received signals are then synchronized in a digital speech radio link (step 904). The volume switch 82 and the power amplifier 83 are rendered operative to enable the ringing. The ringing is generated via the loudspeaker 12 according to the digitally processed ringing data command signal (step 905).

If a user "off-hooks" or closes the hook switch in response to the ringing, the radio unit controller 37 determines whether the hook switch 71 has been off-hooked or the send key on the key section 65 was depressed with the handset 60 still mounted on the cradle 70 (step 906).

As a result, if the handset is picked up or "off-hooked" from the cradle, thereby closing the hook switch 71, the power amplifier 83 is rendered inoperative and the amplifiers 84, 75 are rendered operative. Additionally, according to a control data signal generated by the radio unit controller 37, the cradle controller 72 closes analog switch 74 and controls analog switch 73 to connect analog switch 74 to the handset microphone 61 (step 907).

Receiver 3 receives speech signals transmitted from the base station via the antenna 1 and the duplexer 2 and demodulates the signals into an intermediate frequency signals. The received signals are supplied to the A/D converter 52 where they are converted into digital signals. The digital demodulator 5' demodulates the digital signals into baseband frequency signals and the demodulated signals are supplied to the channel-codec 8. The channel-codec 8 deinterleaves the demodulated signals and performs error correction operations on the deinterleaved signals. The signals output from the channel-codec 8 are supplied to the speech-codec 9 where they are decoded into digital speech signals. The digital speech signals from the speech-codec 9 pass through the echo-canceller 10 via the analog switch 57 and are supplied to the D/A converter 11. The D/A converter 11 converts the decoded digital signals to analog signals and the resulting analog signals are supplied to the amplifier 84 via the analog switch 81. The amplified signals from amplifier 84 are sent to the volume switch 64 in the handset 60 via the cradle 70. In the handset, the volume switch 64 adjusts the speech volume of the amplified signals. The volume-adjusted signals are output via the handset speaker 62.

When speech signals are input to the handset microphone 61, the input signals are applied to the amplifier 75 in the cradle 70 via the analog switches 73, 74. The amplifier 75 amplifies the input signals and supplies the amplified signals to the A/D converter 14. The A/D converter 14 converts the amplified signals into digital signals. The digital signals are supplied to the echo-canceller 10 which passes the digital signals without performing encoding and decoding operations. The output signals from the echo-canceller 10 are applied to the speech-codec 9 via the analog switch 58. The speech-codec 9 encodes the output signals and the encoded speech signals are applied to the channel-codec 8. In the channel-codec 8, an error correcting code is added to the encoded speech signals and the speech signals with the error correcting code are interleaved. The digital modulator 17' modulates the interleaved signals into digital intermediate frequency signals. The D/A converter 55 converts the modulated signals into analog signals and supplies the analog signals to the transmitter 18. The transmitter 18 converts the analog signals into radio frequency signals of 800–900 MHz and power amplifies the resulting radio frequency signals. The power amplified radio frequency signals are transmitted to the base station via the duplexer 2 and the antenna 1.

Figure 12:
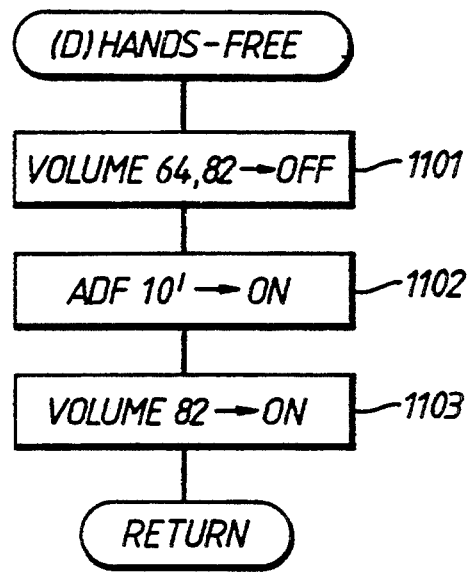
FIG. 12 is a flowchart for explaining the operations shown in step 909 of FIG. 10.

During the handset operation, the radio unit controller 37 determines if the hook switch 71 is "on-hooked" (step 908). If the user put the handset 60 on the cradle 70 (hook switch 71 has been on-hooked) in order to use the hands-free alternative, processing is initiated for changing to hands-free operation. Additionally, as a result of the step 906, if the send key is depressed in response to the ringing, hands-free operation is initiated (step 909). FIG. 12 is a flowchart showing the operation for changing from handset operation to the hands-free operation in the digital mode.

First, the volume switches 64, 82 are rendered inoperative to avoid releasing noise caused by switching through the loudspeaker 12 and the handset speaker 62. Additionally, the radio unit controller 37 renders the amplifier 84 inoperative because it is not used in hands-free operation (step 1101).

Secondly, the radio unit controller 37 renders the ADF 10' and the power amplifier 83 operative. The analog switch 73 is switched to connect the analog switch 74 to the microphone 13 (step 1102). Finally, the radio unit controller 37 renders the volume switch 82 operative (step 1103). The above three steps enable hands-free operation (step 910).

When in hands-free operation, the receiver 3 receives speech signals transmitted from the base station via the antenna 1 and the duplexer 2. The received signals are supplied to the A/D converter 52 where they are converted into digital signals. The digital demodulator 5' demodulates the digital signals and the demodulated signals are supplied to the channel-codec 8. The channel-codec 8 deinterleaves the demodulated signals and performs error correction operations on the deinterleaved signals. The signals output from the channel-codec 8 are supplied to the speech-codec 9 and decoded into digital speech signals. The digital speech signals are applied to the echo-canceller 10 via the analog switch 57. A portion of the output signals are input to the ADF 10' of the echo-canceller 10. The signals output from the echo-canceller are converted into analog signals by D/A converter 11. The resulting analog signals are supplied to the volume switch 82 via the analog switch 81. The volume switch 82 adjusts the speech volume of the analog signals and the volume-adjusted signals are supplied to the power amplifier 83. The power amplifier 83 amplifies the volume-adjusted signals and the power amplified signals are supplied to the cradle 70. In the cradle 70, the power amplified signals are output via the loudspeaker 12.

When speech signals are input to the microphone 13, the input signals are supplied to the amplifier 75 via the analog switches 73, 74 and amplified therein. The amplified signals are supplied to the A/D converter 14 where they are converted into digital signals. The digital signals are supplied to the echo-canceller 10. The echo-canceller 10 cancels echo signals caused by the acoustic signals input to the microphone 13 from the loudspeaker 12. The echo-free signals are supplied to the speech-codec 9 via the analog switch 58. The speech-codec 9 encodes the output signals and the encoded speech signals are supplied to the channel-codec 8. In the channel-codec 8, an error correcting code is added to the encoded speech signals and the resulting speech signals are interleaved. The digital modulator 17' digitally modulates the interleaved signals. The D/A converter 55 converts the modulated signals into analog signals. The resulting analog signals are supplied to the transmitter 18. The transmitter 18 converts the analog signals into radio frequency signals of 800–900 MHz and power amplifies the radio frequency signals. The power amplified radio frequency signals are transmitted to the base station via the duplexer 2 and the antenna 1.

Figure 13:
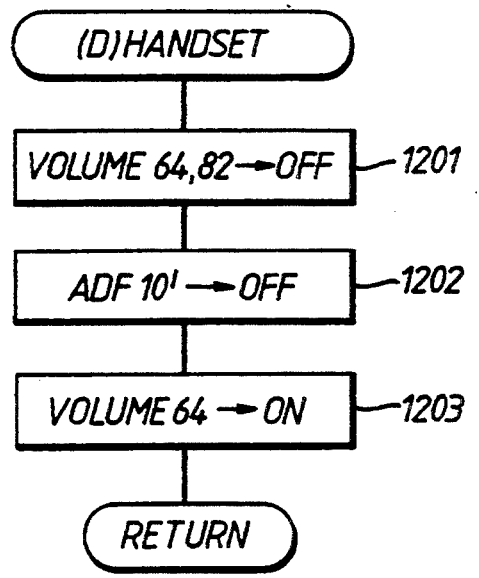
FIG. 13 is a flowchart for explaining the operations shown in step 912 of FIG. 10.

During hands-free operations, the radio unit controller 37 determines if the hook switch 71 is "off-hooked" (step 911). If the user lifts the handset 60 from the cradle 70 (hook switch is off-hooked) in order to change to handset operation, processing for changing to the handset operations is made (step 912). FIG. 13 is a flowchart showing the operations for changing to handset operation from hands-free operation while in the digital mode.

First, the volume switches 64, 82 are rendered inoperative to avoid releasing noise caused by switching through the loudspeaker 12 and the handset speaker 62. Additionally, the radio unit controller 37 renders the power amplifier 83 inoperative because it does not need to operate in the handset operation (step 1201).

Secondly, the radio unit controller 37 renders the ADF 10' inoperative and the amplifier 84 operative. The analog switch 73 connects the analog switch 74 to the handset microphone 61 (step 1202). Finally, the radio unit controller 37 renders the volume switch 64 operative (step 1203). The above three steps enable handset operation (step 907).

If the designated mode at step 902 is the analog mode, the operations are as follows. The volume switch 82 and the power amplifier 83 are rendered operative to enable the ringing. The ringing is generated via the loudspeaker 12 according to the ringing data command signal, which is processed in analog (step 913).

If the user "off-hooks" or closes the hook switch in response to the ringing, the radio unit controller 37 determines whether the hook switch 71 has been off-hooked or the send key was depressed with the handset 60 still mounted on the cradle 70 (step 914).

As a result, if the handset is picked up or "off-hooked" from the cradle, thereby closing the hook switch 71, the radio unit controller 37 renders the volume switch 82 and the power amplifier 83 inoperative and the amplifiers 84, 75 operative. Additionally, according to a control data signal from the radio unit controller 37, the cradle controller 72 closes the analog switch 74 and controls the analog switch 73 to connect the analog switch 74 to the handset microphone 61 (step 915).

When the receiver 3 receives speech signals transmitted from the base station via the antenna 1 and the duplexer 2, the receiver 3 demodulates the speech signals into baseband frequency signals. The analog audio circuit 20 band limits and expands the demodulated signals. The expanded signals are applied to the amplifier 84 via the analog switch 81. The amplifier 84 amplifies the expanded signals and supplies the amplified signals to the volume switch 64 in the handset 60. The volume switch 64 adjusts the speech volume of the amplified signals and outputs the volume-adjusted signals via the handset speaker 62.

When speech signals are input to the handset microphone 61, the input signals are supplied to the amplifier 75 via the analog switches 73, 74. The amplifier 75 amplifies the speech signals and supplies the amplified signals to the analog audio circuit 20 via the analog switch 59. The analog audio circuit 20 band limits and compresses the amplified signals. The transmitter 18 modulates the compressed signals and transmits the signals to the base station via the duplexer 2 and the antenna 1.

Figure 14:
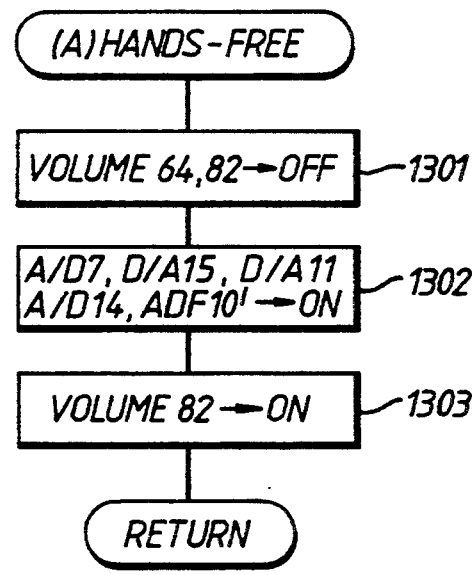
FIG. 14 is a flowchart for explaining the operations shown in step 917 of FIG. 10.

During the handset operations, the radio unit controller 37 determines if the hook switch 71 is "on-hooked" (step 916). If the user put the handset 60 on the cradle 70 (hook switch 71 has been on-hooked) in order to change to hands-free operation, processing is initiated for changing to the hands-free operation. Additionally, as a result of the step 914, if the send key is depressed in response to the ringing, hands-free operation is initiated (step 917). FIG. 14 is a flowchart showing the operations for changing to hands-free operation from the handset operation in the analog mode.

First, the volume switches 64, 82 are rendered inoperative to releasing noise caused by switching through the loudspeaker 12 and the handset speaker 62. Additionally, the radio unit controller 37 renders the amplifier 84 inoperative (step 1301).

Secondly, the radio unit controller 37 switches on or closes the analog switch 92 in order to operate the A/D converters 7, 14, the D/A converters 11, 15, and the ADF 10' in the echo-canceller 10. A control signal is provided to operate the ADF 10'. The radio unit -controller 37 also renders the power amplifier 83 operative and controls the analog switch 73 to connect the analog switch 74 to the microphone 13 (step 1302). Finally, the radio unit controller 37 renders the volume switch 82 operative (step 1303). The above three steps enable hands-free operation (step 918).

When in hands-free operation, the receiver 3 receives speech signals transmitted from the base station via the antenna 1 and the duplexer 2. The receiver 3 demodulates the speech signals. The analog audio circuit 20 band limits and expands the demodulated signals. The expanded signals are supplied to the A/D converter 7. The A/D converter 7 converts the expanded signals into digital signals. The digital signals are supplied to the echo-canceller 10 via the analog switch 57. In the echo-canceller 10, a portion of the digital signals is input to the ADF 10'. The signals output from the echo-canceller 10 are supplied to the D/A converter. The D/A converter 11 converts the output signals into analog signals. The analog signals are supplied to the volume switch 82 via the analog switch 81. The volume switch 82 adjusts the speech volume of the analog signals and the power amplifier 83 amplifies the volume-adjusted signals. The power amplified signals are sent to the speaker 12 in the cradle 70. In the cradle 70, the power amplified signals are output via the loudspeaker 12.

When speech signals are input to the microphone 13, the input signals are supplied to the amplifier 75 via the analog switches 73, 74. The amplifier 75 amplifies the speech signals and supplies the amplified signals to the A/D converter 14. The A/D converter 14 converts the amplified signals to digital signals. The digital signals are supplied to the echo-canceller 10. The echo-canceller 10 cancels echo signals caused by the acoustic signals input to the microphone 13 from the loudspeaker 12. The echo-free signals are supplied to the D/A converter 15 via the analog switch 58. The D/A converter 15 converts the echo-free signals into analog signals. The analog signals are supplied to the analog audio circuit 20 via the analog switch 59. The analog audio circuit 20 band limits and compresses the amplified signals. The compressed signals are applied to the transmitter 18. The transmitter 18 modulates the compressed signals and transmits the signals to the base station via the duplexer 2 and the antenna 1.

Figure 15:
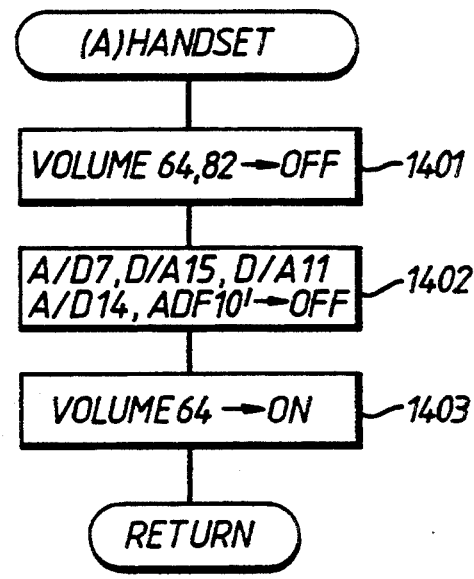
FIG. 15 is a flowchart for explaining the operations shown in step 920 of FIG. 10.

During hands-free operations, the radio unit controller 37 determines if the hook switch 71 is "off-hooked" (step 919). If the user lifts the handset 60 from the cradle 70 (hook switch 71 has been off-hooked) in order to change to handset operation, processing for changing to handset operation is made (step 920). FIG. 15 is a flowchart showing the operations for changing to handset operation from hands-free operation in the analog mode.

First, the volume switches 64, 82 are rendered inoperative to avoid releasing noise caused by switching through the loudspeaker 12 and the handset speaker 62. Additionally, the radio unit controller 37 renders the power amplifier 83 inoperative (step 1401).

Secondly, the radio unit controller 37 switches off or opens the analog switch 92 in order to prevent the operation of the A/D converters 7, 14, the D/A converts 11, 15, and the ADF 10' in the echo-canceller 10. The radio unit controller 37 also renders the amplifier 84 operative and controls the analog switch 73 to connect the analog switch 74 to the handset microphone 61 (step 1402). Finally, the radio unit controller 37 renders the volume switch 64 operative (step 1403). The above three steps enable handset operation (step 915).

In any of the steps described above in the seventh embodiment of the present invention, the speech communication or the processing will be terminated if the end key on the key section 65 is depressed.

Figure 11A:
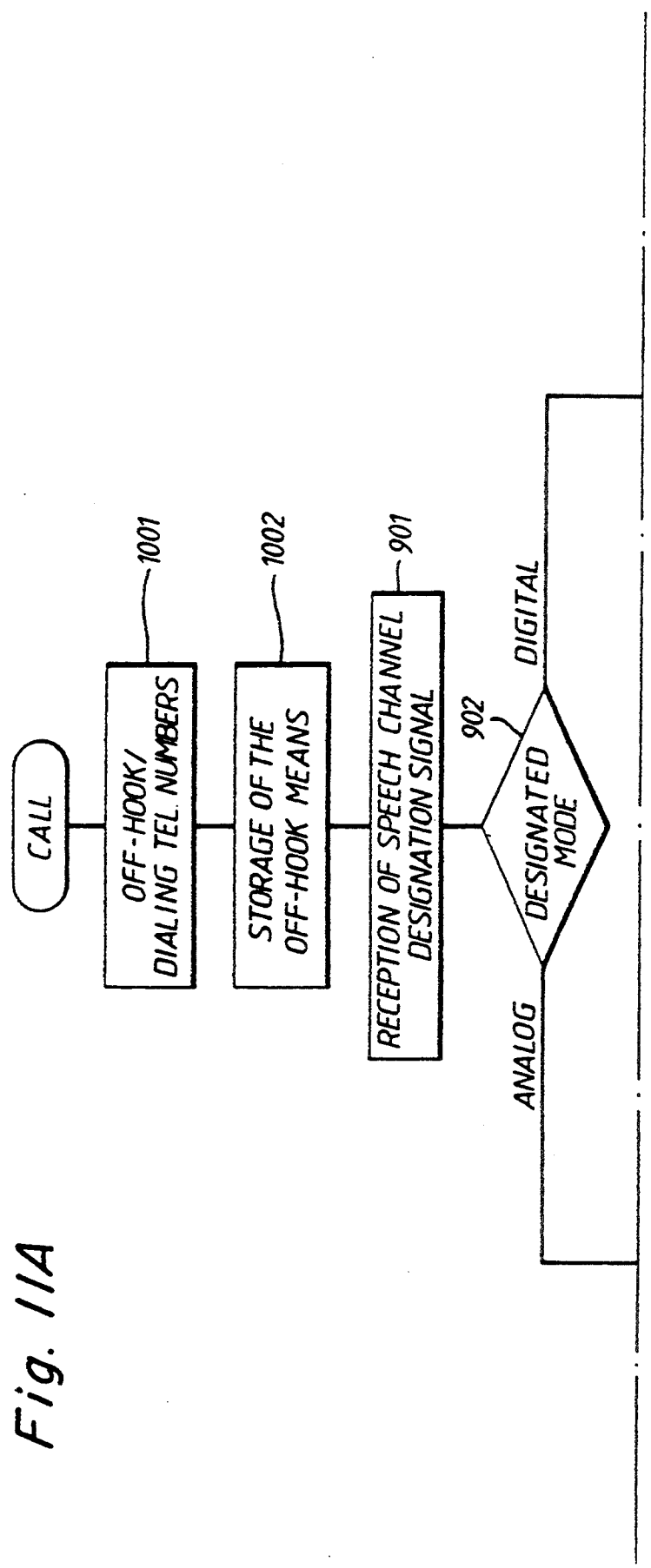
FIGS. 11A and 11B depict a flowchart for explaining the operations of the telephone shown in FIGS. 8 and 9 when a call is made.
Figure 11B:
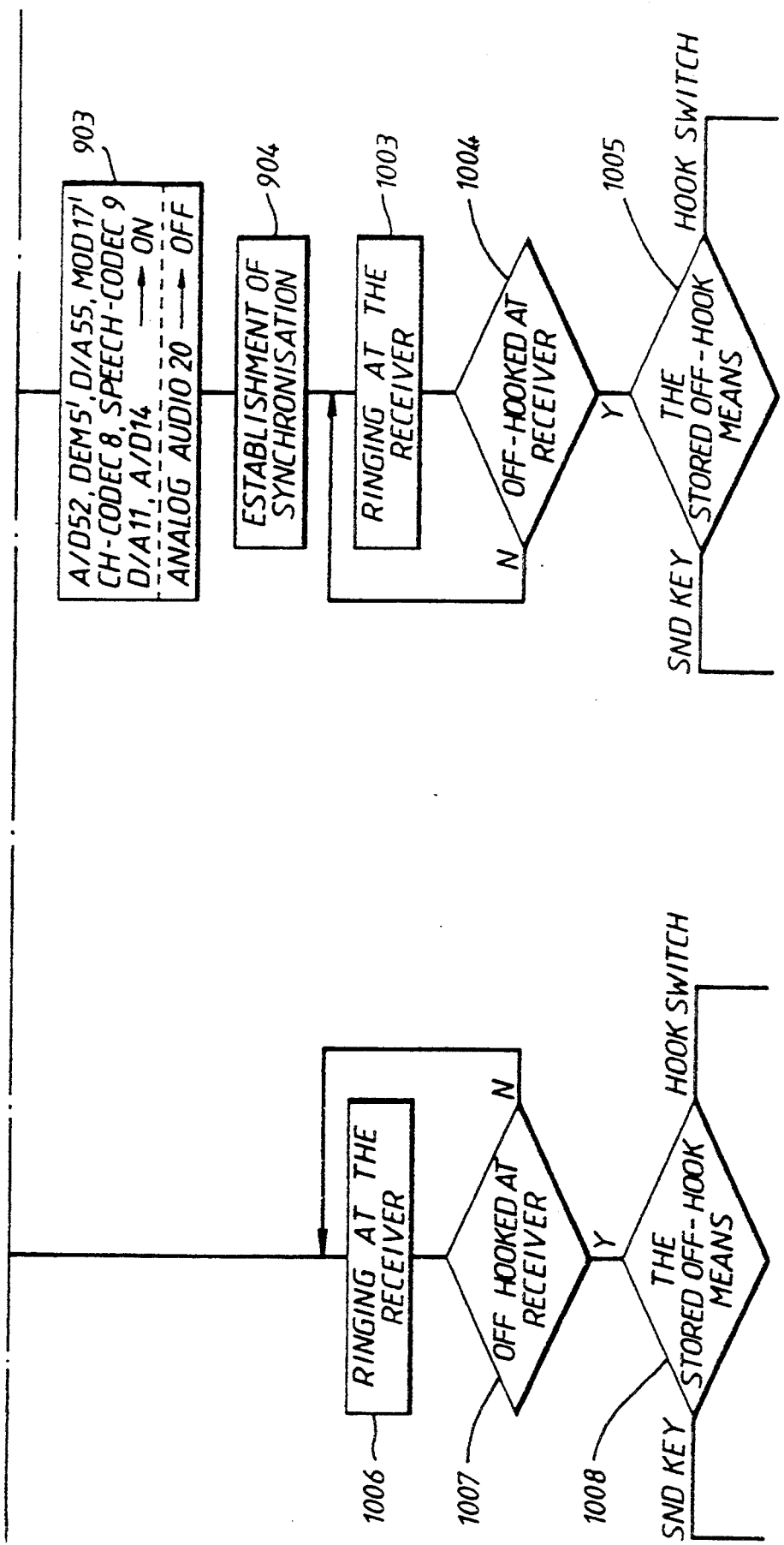

FIGS. 11A and 11B depict a flowchart showing the switching operations for the analog switches when a call is made. When a mobile radio telephone is used for both hands-free and handset operations, such as the mobile radio telephone in the seventh embodiment, there are two ways to make a call.

One way that a call can be made is by "off-hooking" the hook switch 71. That is, after the user lifts the handset 60 from the cradle 70, the user dials telephone numbers with the keys on the key section 65. The other way that a call can be made is by depressing the send key. That is, after the user dials the telephone numbers on the keys of the key section 65, the user depresses the send key. When a call is made by either one of the two ways (step 1001), the RAM 100 stores whether off-hook is made by the hook switch 71 or by the send key (step 1002).

Steps 901 to 904 are the same as described in FIGS. 9A and 9B. In step 902, if the digital mode is designated, the ringing is generated at the call receiver after the step 904 (step 1003). In response to the call receiver's "off-hook" signal indicating that the call receiver answered the ringing (step 1004), the radio unit controller 37 determines whether the stored off-hook is attributable to the hook switch 71 or the send key (step 1005). If the stored off-hook is attributable to the hook switch 71, handset operation will be initiated. If the stored off-hook is attributable to the send key, hands-free operation will be initiated. The description of speech communication after the step 1005 has already been described for FIGS. 10A and 10B.

In the step 902, if the designated mode is an analog mode, the ringing is generated at the call receiver. (step 1006). In response to the call receiver's "off-hook" (step 1007), the radio unit controller 37 determines whether the stored off-hook was attributable the hook switch 71 or the send key (step 1008). If the stored off-hook is attributable to the hook switch 71, handset operation will be initiated. If the stored off-hook is attributable to the send key, hands-free operation will be initiated. The description of speech communication after the step 1008 has been already described in the description of FIG. 10.

As described above, the power supplied to the oscillators is cut off so that, during a particular mode, clock signals from the oscillators are not supplied to the circuits that are not required for operation in that mode. Consequently, battery power consumption may effectively be reduced. The clock supply may be controlled through the switches provided between the oscillators and the circuits.

Additionally, the apparatus may be further reduced in size according to the seventh embodiment because the circuits are more easily integrated when the digital modulator and the digital demodulator are digital circuits.

In the seventh embodiment, the operation of the ADF 10' depends on the control signal even if the analog switch 92 is on. However, the ADF 10' may be controlled in accordance with switching operations of the analog switch 92 as are the channel-codec 8 and the speech-codec 9. The ADF 10' may be rendered operative when power is supplied to the ADF 10' and may be rendered inoperative when power is not supplied to the ADF 10'.

Furthermore, the operation of other circuits in the seventh embodiment, such as the A/D converter 52 and the D/A converter 55, may be controlled using the power supply, as in other embodiments. For example, a particular circuit may be rendered operative when power is supplied thereto and may be rendered inoperative when power is not supplied thereto. In addition, the digital signal processing circuits may be programmed, in a manner similar to the ADF 10', to cease operations in response to a control signal from a controller.

Still further, although the embodiments of the present invention applied to a mobile unit of a cellular radio telephone system have been described above, the present invention may be applied to any other kind of radio communication apparatus having an echo-canceller which selectively transmits speech signals in an analog mode or a digital mode, including but not limited to a base station apparatus of a cellular radio telephone system, a portable telephone and a cordless telephone.

Other variations, such as arrangement of and placement of analog switches, control process, and control command of the controller, may be made within the scope of the present invention.

The invention claimed is:

1. A radio communication apparatus for use in a dual mode radio system wherein speech signals are selectively transmitted in an analog mode or a digital mode over a radio link established between a base station and the radio communication apparatus comprising:
receiving means for receiving radio frequency signals transmitted over the radio link, for obtaining signals of a certain frequency from the received radio frequency signals, and for outputting the signals of a certain frequency;
transmitting means for converting signals applied to the transmitting means to radio frequency signals and for transmitting the radio frequency signals over the radio link;
speech input means for inputting speech signals to be transmitted over the radio link;
first analog-to-digital converting means for converting the input speech signals into digital speech signals;
speech output means for outputting speech signals corresponding to the received radio frequency signals;
first digital-to-analog converting means for converting digital speech signals into analog speech signals and for outputting the analog speech signals to the speech output means;
echo cancelling means coupled to the first analog-to-digital converting means and the first digital-to-analog converting means for cancelling echo signals caused by acoustic coupling between the speech input means and the speech output means and for outputting echo-free signals;
first processing means, when the radio communication apparatus operates in the digital mode, for converting the signals from the receiving means into digital signals, decoding the converted digital signals, and outputting the decoded signals to the echo cancelling means and for encoding the echo-free signals from the echo cancelling means, converting the encoded signals into analog signals, and supplying the analog signals to the transmitting means;
second digital-to-analog converting means for converting the echo-free signals from the echo-cancelling means into analog signals;
second processing means, when the radio communication apparatus operates in the analog mode, for processing the signals from the receiving means and outputting the processed signals and for processing the analog signals from the second digital-to-analog converting means and outputting the processed signals to the transmitting means; and
second analog-to-digital converting means for converting the processed signals from the second processing means into digital signals and for supplying the digital signals to the echo cancelling means.

2. A radio communication apparatus for use in a dual mode radio system wherein speech signals are selectively transmitted in an analog mode or a digital mode over a radio link established between a base station and the radio communication apparatus comprising:
receiving means for receiving radio frequency signals transmitted over the radio link;
transmitting means for transmitting signals over the radio link;
speech input means for inputting speech signals to be transmitted over the radio link;
speech output means for outputting speech signals corresponding to the received signals;
echo cancelling means coupled to the speech input means and the speech output means for cancelling echo signals caused by acoustic coupling between the speech input means and the speech output means and for outputting echo-free signals;
first processing means, when the radio communication apparatus operates in the digital mode, for processing the received signals from the receiving means and outputting the processed signals to the echo cancelling means and for processing the echo-free signals from the echo cancelling means and outputting the processed signals to the transmitting means; and
second processing means, when the radio communication apparatus operates in the analog mode, for processing the received signals from the receiving means and outputting the processed signals to the echo cancelling means and for processing the echo-free signals from the echo cancelling means and outputting the processed signals to the transmitting means.

3. A radio communication apparatus for use in a radio system with a plurality of modes wherein speech signals are selectively transmitted in one of the plurality of modes over a radio link established between a base station and the radio communication apparatus comprising:
receiving means for receiving radio frequency signals transmitted over the radio link, for demodulating the received radio frequency signals into analog signals of a certain frequency, and for outputting demodulated analog signals;
transmitting means for modulating signals into radio frequency signals and for transmitting the radio frequency signals over the radio link;
speech input means for inputting speech signals to be transmitted by the radio communication apparatus;
first analog-to-digital converting means for converting the input speech signals into digital speech signals;
first digital-to-analog converting means for converting digital signals into analog speech signals;
speech output means coupled to said first digital-to-analog converting means for outputting speech signals corresponding to the received radio frequency signals;
echo cancelling means coupled to said first analog-to-digital converting means and said first digital-to-analog converting means for cancelling echo signals caused by acoustic coupling between the speech input means and the speech output means and for outputting echo-free signals;
second analog-to-digital converting means for converting the demodulated analog signals from said receiving means into digital signals when the radio communication apparatus operates in a first mode;
decoding and encoding means for decoding the digital signals from the second analog-to-digital converting means and for outputting the decoded signals to the echo cancelling means and also for encoding the echo-free signals from said echo cancelling means when the radio communication apparatus operates in the first mode;

second digital-to-analog converting means for converting the encoded signals from said decoding and coding means into analog signals and for supplying the analog signals to said transmitting means when the radio communication apparatus operates in the first mode;

third digital-to-analog converting means for converting the echo-free signals from said echo cancelling means into analog signals when the radio communication apparatus operates in a second mode;

analog signal processing means for processing the analog signals from said third digital-to-analog converting means, for supplying the processed analog signals to said transmitting means, for processing the demodulated analog signals from said receiving means, and for outputting the processed analog signals when the radio communication apparatus operates in the second mode; and third analog-to-digital converting means for converting the processed analog signals from said analog signal processing means into digital signals and for supplying the digital signals to the echo cancelling means when the radio communication apparatus operates in the second mode.

4. A radio communication apparatus for use in a radio system with a plurality of modes wherein speech signals are selectively transmitted in one of the plurality of modes over a radio link established between a base station and the radio communication apparatus comprising:

receiving means for receiving radio frequency signals transmitted over the radio link, for obtaining signals of a certain frequency from the received radio frequency signals, and for outputting the signals of a certain frequency;

transmitting means for converting signals applied to the transmitting means to radio frequency signals and for transmitting the radio frequency signals over the radio link;

speech input means for inputting speech signals to be transmitted over the radio link;

first analog-to-digital converting means for converting the input speech signals into digital speech signals;

speech output means for outputting speech signals corresponding to the received radio frequency signals;

first digital-to-analog converting means for converting digital speech signals into analog speech signals and for outputting the analog speech signals to the speech output means;

echo cancelling means coupled to the first analog-to-digital converting means and the first digital-to-analog converting means for cancelling echo signals caused by acoustic coupling between the speech input means and the speech output means and for outputting echo-free signals;

first processing means, when the radio communication apparatus operates in a first mode, for converting the signals from the receiving means into digital signals, decoding the converted digital signals, and outputting the decoded signals to the echo cancelling means and for encoding the echo-free signals from the echo cancelling means, converting the encoded signals into analog signals, and supplying the analog signals to the transmitting means;

second digital-to-analog converting means for converting the echo-free signals from the echo-cancelling means into analog signals;

second processing means, when the radio communication apparatus operates in a second mode, for processing the signals from the receiving means and outputting the processed signals and for processing the analog signals from the second digital-to-analog converting means and outputting the processed signals to the transmitting means; and second analog-to-digital converting means for converting the processed signals from the second processing means into digital signals and for supplying the digital signals to the echo cancelling means.

5. The radio communication apparatus according to claim 4 wherein the receiving means processes the obtained signals of a certain frequency and outputs the processed signals of a certain frequency.

6. The radio communication apparatus according to claim 4 wherein the receiving means demodulates the obtained signals of a certain frequency and outputs the demodulated signals of a certain frequency.

7. The radio communication apparatus according to claim 4 wherein the transmitting means processes signals applied to the transmitting means, converts the processed signals to radio frequency signals, and transmits the radio frequency signals over the radio link.

8. The radio communication apparatus according to claim 4 wherein the transmitting means modulates signals applied to the transmitting means, converts the modulated signals to radio frequency signals, and transmits the radio frequency signals over the radio link.

9. A radio communication apparatus for use in a radio system with a plurality of modes wherein speech signals are selectively transmitted in one of the plurality of modes over a radio link established between a base station and the radio communication apparatus comprising:

receiving means for receiving radio frequency signals transmitted over the radio link;

transmitting means for transmitting signals over the radio link;

speech input means for inputting speech signals to be transmitted over the radio link;

speech output means for outputting speech signals corresponding to the received signals;

echo cancelling means coupled to the speech input means and the speech output means for cancelling echo signals caused by acoustic coupling between the speech input means and the speech output means and for outputting echo-free signals;

first processing means, when the radio communication apparatus operates in a first mode, for processing the received signals from the receiving means and outputting the processed signals to the echo cancelling means and for processing the echo-free signals from the echo cancelling means and outputting the processed signals to the transmitting means; and second processing means, when the radio communication apparatus operates in a second mode, for processing the received signals from the receiving means and outputting the processed signals to the echo cancelling means and for processing the echo-free signals from the echo cancelling means and outputting the processed signals to the transmitting means.

* * * * *